(12) United States Patent
Castagna

(10) Patent No.: US 10,180,881 B2
(45) Date of Patent: Jan. 15, 2019

(54) SYSTEM FOR INCREASING INTER-APPLICATION PROCESSING EFFICIENCY BY TRANSMITTING FAILED PROCESSING WORK OVER A PROCESSING RECOVERY NETWORK FOR RESOLUTION

(71) Applicant: Bank of America Corporation, Charlotte, NC (US)

(72) Inventor: Brandon Matthew Castagna, Mount Holly, NC (US)

(73) Assignee: Bank of America Corporation, Charlotte, NC (US)

( * ) Notice: Subject to any disclaimer, the term of this patent is extended or adjusted under 35 U.S.C. 154(b) by 143 days.

(21) Appl. No.: 15/242,197

(22) Filed: Aug. 19, 2016

(65) Prior Publication Data
US 2018/0052739 A1 Feb. 22, 2018

(51) Int. Cl.
| | |
|---|---|
| *G06F 11/00* | (2006.01) |
| *G06F 11/14* | (2006.01) |
| *G06F 9/46* | (2006.01) |
| *H04L 29/08* | (2006.01) |

(52) U.S. Cl.
CPC ......... *G06F 11/1438* (2013.01); *G06F 9/466* (2013.01); *G06F 11/1474* (2013.01); *H04L 67/142* (2013.01); *G06F 2201/805* (2013.01); *G06F 2201/82* (2013.01); *H04L 67/22* (2013.01)

(58) Field of Classification Search
CPC ... G06F 11/1438; G06F 11/1474; G06F 9/466
See application file for complete search history.

(56) References Cited

U.S. PATENT DOCUMENTS

| | | | |
|---|---|---|---|
| 6,105,147 A | * | 8/2000 | Molloy .............. G06F 11/1438 714/16 |
| 6,550,052 B1 | | 4/2003 | Joyce et al. |
| 7,069,546 B2 | | 6/2006 | Tsarfati |
| 7,454,422 B2 | | 11/2008 | Chan et al. |
| 7,818,757 B1 | * | 10/2010 | Tsimelzon ............. G06F 9/546 709/231 |
| 7,934,116 B2 | | 4/2011 | Mehrdad |
| 8,121,966 B2 | | 2/2012 | Routray et al. |
| 8,132,043 B2 | | 3/2012 | Dash et al. |
| 8,433,768 B1 | | 4/2013 | Bush et al. |
| 8,572,431 B2 | | 10/2013 | Adler et al. |
| 8,661,407 B2 | | 2/2014 | Siegemund et al. |

(Continued)

*Primary Examiner* — Philip Guyton
(74) *Attorney, Agent, or Firm* — Michael A. Springs; Moore & Van Allen PLLC; Patrick B. Horne

(57) ABSTRACT

Embodiments of the present invention also provide a system for increasing inter-application efficiency by conducting recovery of end-to-end transactions. Embodiments of the invention allow a transaction manager to track the status of a transaction being processed by a plurality of nodes in an array in order to perform error recovery of failed transactions within a node. The recovery process may involve restarting the transaction at the global step and the local step at which the transaction failed. By avoiding restarting the end-to-end transaction from the first step, the system may save precious computing resources of the computer systems within the nodes processing the end-to-end transaction, including, but not limited to, processing power, memory space, storage space, cache space, electric power, networking bandwidth, and I/O calls.

20 Claims, 16 Drawing Sheets

(56) References Cited

U.S. PATENT DOCUMENTS

| | | | |
|---|---|---|---|
| 8,938,456 B2 | 1/2015 | Chappell et al. | |
| 9,077,659 B2 | 7/2015 | Armstrong et al. | |
| 9,110,758 B2 | 8/2015 | Bridges | |
| 9,148,369 B2 | 9/2015 | Armstrong et al. | |
| 9,244,811 B1 | 1/2016 | Kulkarni et al. | |
| 9,372,767 B2 | 6/2016 | Holtz et al. | |
| 2002/0188653 A1* | 12/2002 | Sun | G06F 11/1438 709/201 |
| 2005/0125557 A1 | 6/2005 | Vasudevan et al. | |
| 2005/0209832 A1 | 9/2005 | Kasravi et al. | |
| 2006/0123425 A1 | 6/2006 | Ramarao et al. | |
| 2006/0168334 A1 | 7/2006 | Potti et al. | |
| 2007/0005786 A1 | 1/2007 | Kumar et al. | |
| 2007/0043726 A1 | 2/2007 | Chan et al. | |
| 2007/0043975 A1* | 2/2007 | Varadarajan | G06F 11/1438 714/25 |
| 2007/0180302 A1 | 8/2007 | Allen et al. | |
| 2007/0198997 A1 | 8/2007 | Jacops et al. | |
| 2007/0239728 A1* | 10/2007 | Smits | G06F 11/1438 |
| 2008/0141263 A1 | 6/2008 | Song et al. | |
| 2008/0162590 A1 | 7/2008 | Kundu et al. | |
| 2010/0332532 A1 | 12/2010 | Joshi et al. | |
| 2011/0302140 A1 | 12/2011 | Gokhale et al. | |
| 2012/0198287 A1 | 8/2012 | Day et al. | |
| 2012/0215740 A1 | 8/2012 | Vaillant et al. | |
| 2012/0216073 A1* | 8/2012 | Douros | G06F 9/485 714/19 |
| 2013/0097457 A1 | 4/2013 | Drucker et al. | |
| 2014/0081916 A1 | 3/2014 | McAlister et al. | |
| 2014/0304545 A1* | 10/2014 | Chen | G06F 9/46 714/4.3 |
| 2015/0149823 A1* | 5/2015 | McCarthy | G06F 11/1441 714/15 |
| 2015/0212906 A1* | 7/2015 | Gschwind | G06F 11/1474 714/15 |
| 2015/0347245 A1 | 12/2015 | Andre et al. | |
| 2016/0094420 A1 | 3/2016 | Clemm et al. | |
| 2016/0239396 A1 | 8/2016 | Deng et al. | |
| 2018/0052739 A1* | 2/2018 | Castagna | G06F 11/1438 |
| 2018/0052747 A1* | 2/2018 | Castagna | G06F 11/2033 |

* cited by examiner

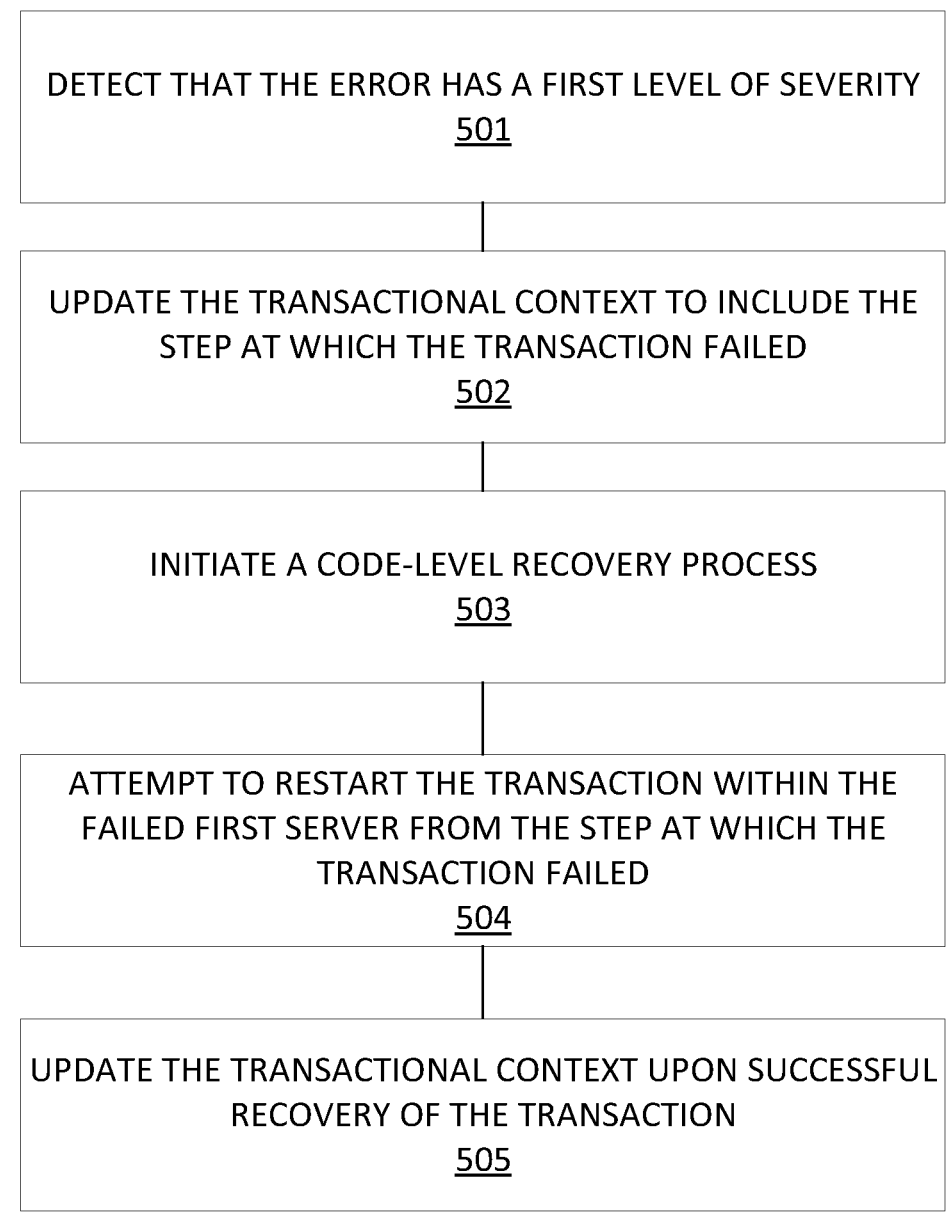

DETECT THAT THE ERROR HAS A SECOND LEVEL OF SEVERITY
601

INITIATE A LOCAL-LEVEL RECOVERY PROCESS
602

UPDATE THE TRANSACTIONAL CONTEXT TO INCLUDE THE STEP AT WHICH THE TRANSACTION FAILED
603

SEND THE TRANSACTIONAL CONTEXT TO A NONFAILED FIRST SERVER WITHIN THE FIRST DATA CENTER
604

ATTEMPT TO RESTART THE TRANSACTION WITHIN A NON-FAILED FIRST SERVER FROM THE STEP AT WHICH THE TRANSACTION FAILED
605

UPDATE THE TRANSACTIONAL CONTEXT UPON SUCCESSFUL TRANSACTION RECOVERY
606

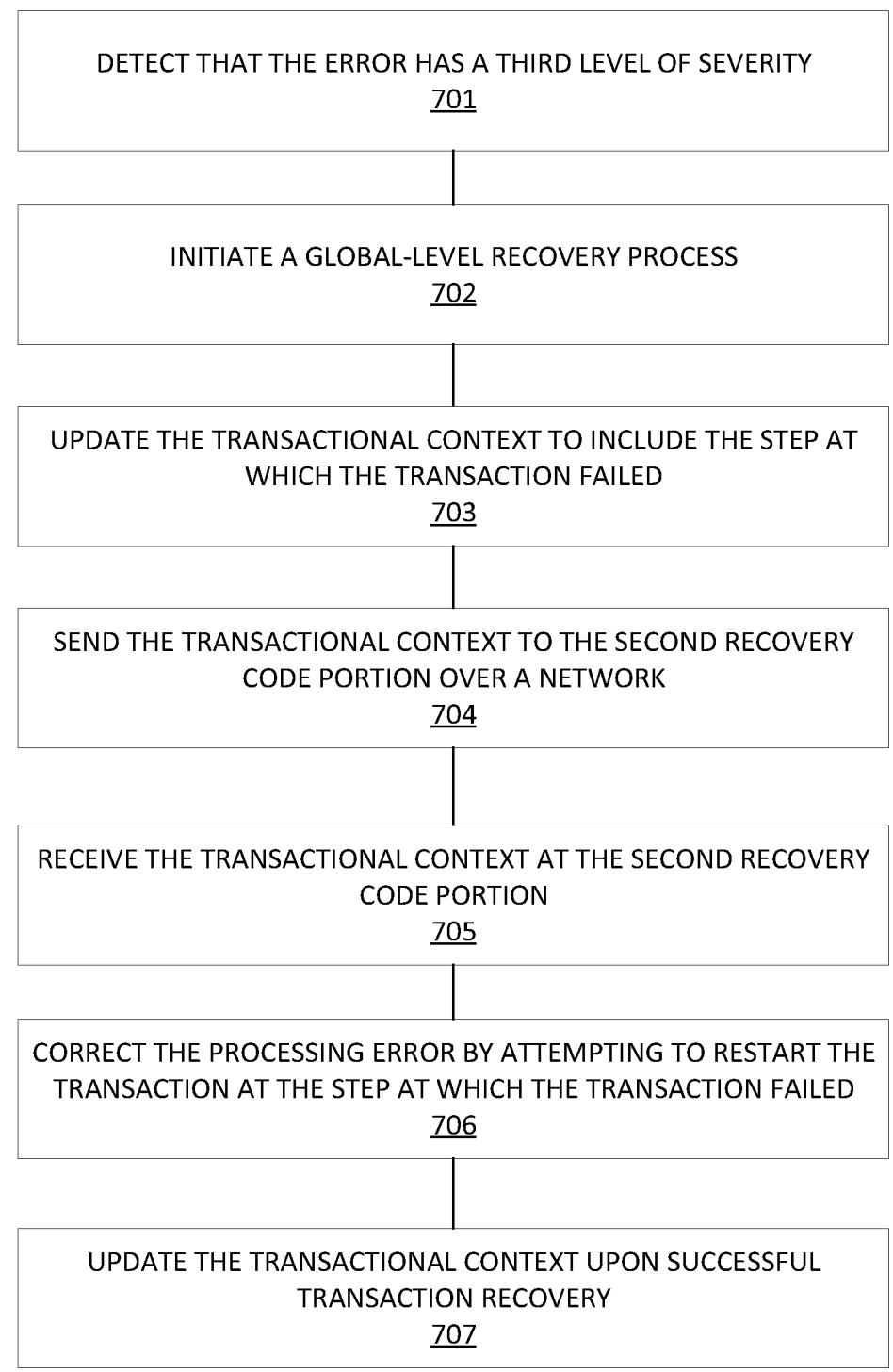

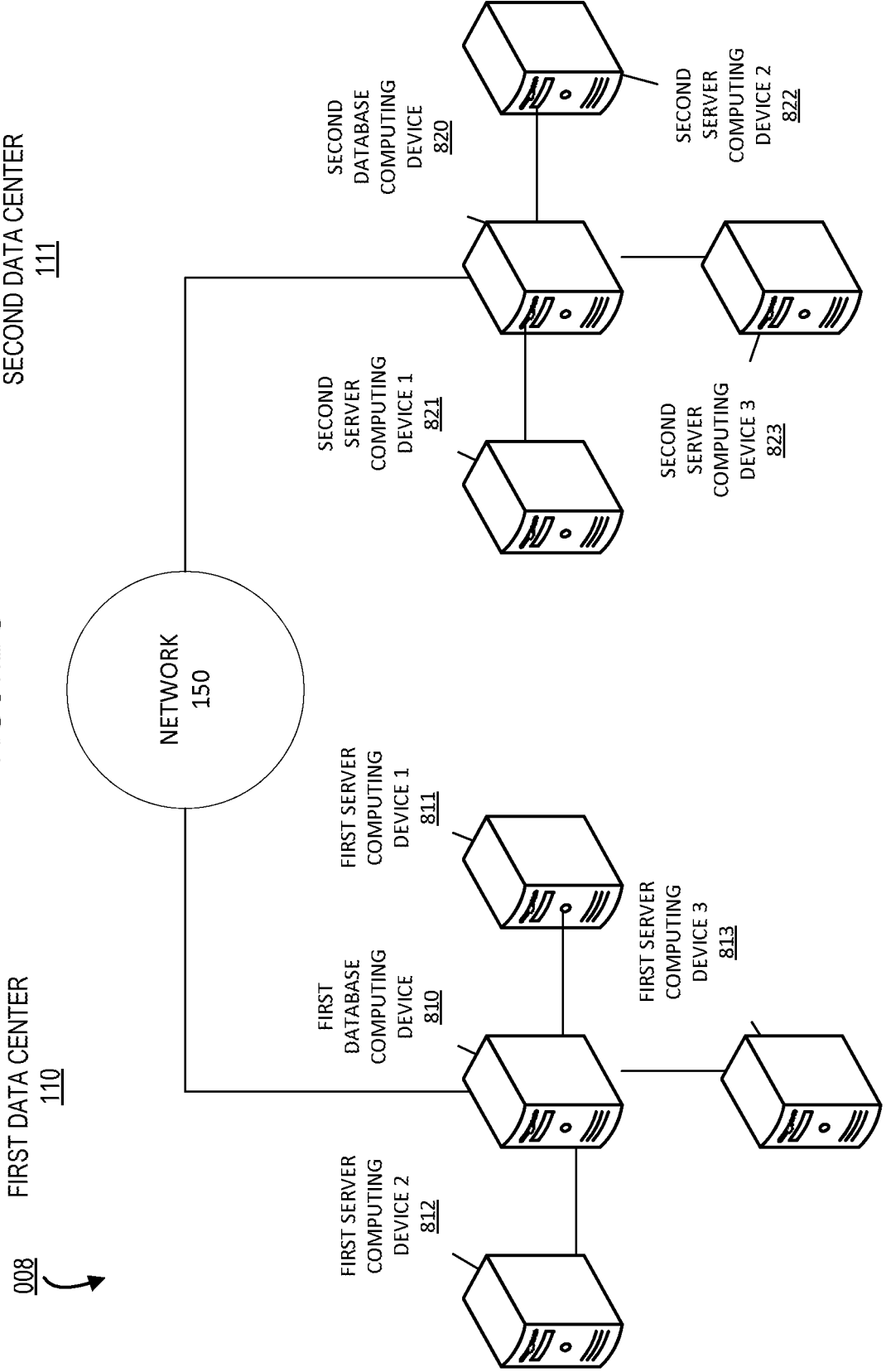

```
                    ┌─────────────────────────────────────────────────┐
                    │ GENERATING A TRANSACTIONAL CONTEXT WITHIN AN     │
    015             │ UPSTREAM RECOVERY CODE PORTION OF AN UPSTREAM    │
                    │ APPLICATION                                      │
                    │ 1501                                             │
                    └─────────────────────────────────────────────────┘
                                          │
                    ┌─────────────────────────────────────────────────┐
                    │ DETERMINING THAT A LOCAL TRANSACTION WITHIN THE  │
                    │ UPSTREAM APPLICATION HAS SUCCESSFULLY COMPLETED  │
                    │ 1502                                             │
                    └─────────────────────────────────────────────────┘
                                          │
                    ┌─────────────────────────────────────────────────┐
                    │ PUBLISHING AN UPSTREAM COMPLETION EVENT TO THE   │
                    │ TRANSACTION MANAGER                              │
                    │ 1503                                             │
                    └─────────────────────────────────────────────────┘
                                          │
                    ┌─────────────────────────────────────────────────┐
                    │ SENDING THE TRANSACTIONAL CONTEXT TO THE NEXT    │
                    │ NODE IN THE SEQUENTIAL ARRAY OF NODES            │
                    │ 1504                                             │
                    └─────────────────────────────────────────────────┘
                                          │
                    ┌─────────────────────────────────────────────────┐
                    │ RECEIVING THE TRANSACTIONAL CONTEXT AT THE       │
                    │ RECOVERY CODE PORTION                            │
                    │ 1505                                             │
                    └─────────────────────────────────────────────────┘
                                          │
                    ┌─────────────────────────────────────────────────┐
                    │ APPENDING TO THE SET OF METADATA A STATE OF A    │
                    │ LOCAL TRANSACTION WITHIN THE DOWNSTREAM          │
                    │ APPLICATION                                      │
                    │ 1506                                             │
                    └─────────────────────────────────────────────────┘
                                          │
                    ┌─────────────────────────────────────────────────┐
                    │ UPDATING THE STATE OF THE END-TO-END TRANSACTION │
                    │ 1507                                             │
                    └─────────────────────────────────────────────────┘
                                          │
                    ┌─────────────────────────────────────────────────┐
                    │ PUBLISHING A DOWNSTREAM COMPLETION EVENT TO THE  │
                    │ TRANSACTION MANAGER                              │
                    │ 1508                                             │
                    └─────────────────────────────────────────────────┘
                                          │
                    ┌─────────────────────────────────────────────────┐
                    │ DELETING THE TRANSACTIONAL CONTEXT               │
                    │ 1509                                             │
                    └─────────────────────────────────────────────────┘
```

FIGURE 15

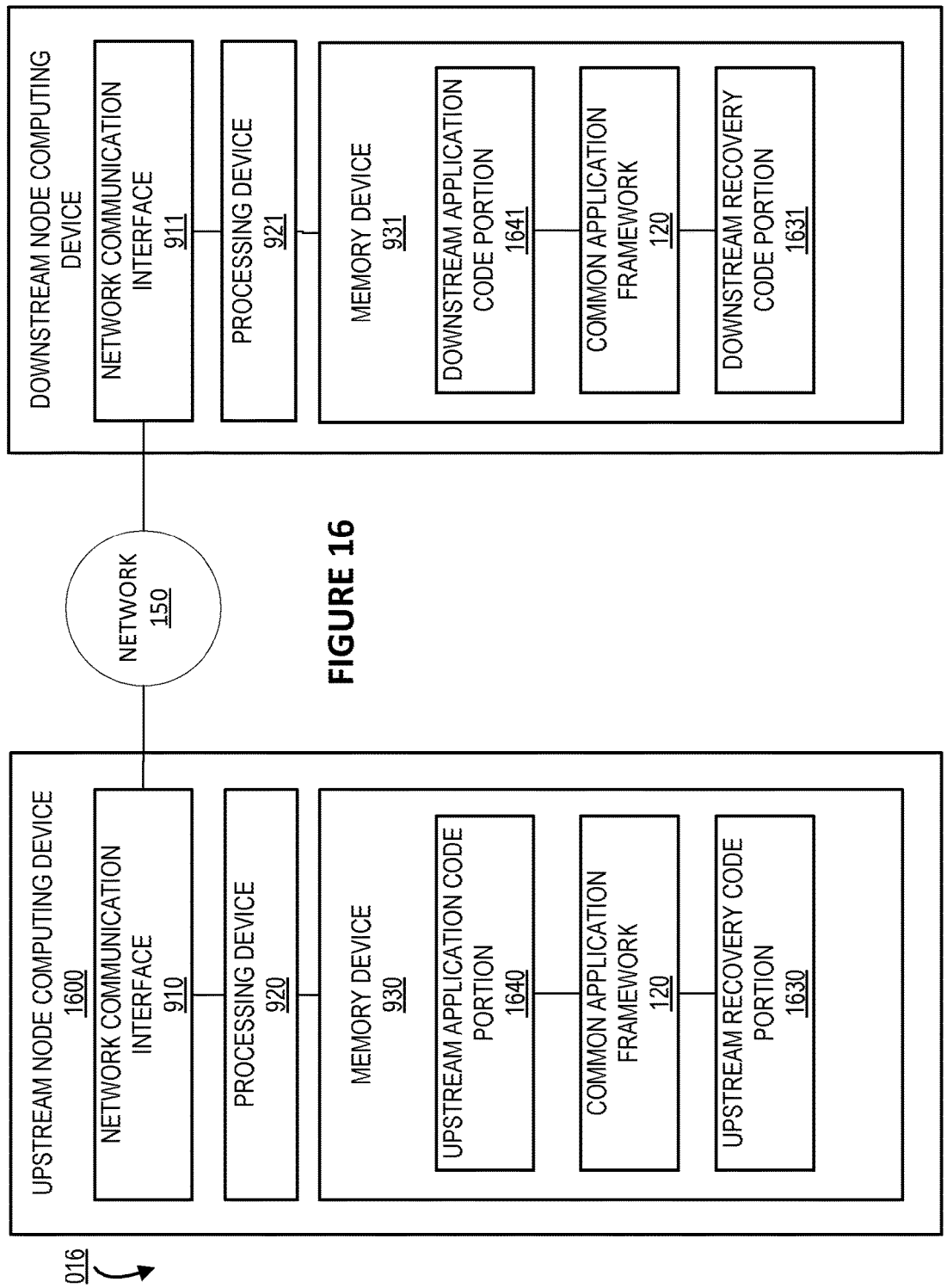

SYSTEM FOR INCREASING INTER-APPLICATION PROCESSING EFFICIENCY BY TRANSMITTING FAILED PROCESSING WORK OVER A PROCESSING RECOVERY NETWORK FOR RESOLUTION

BACKGROUND

In the computing space, a sequence of disparate applications may work in concerted effort to process a transaction from one end to another. In traditional methods for conducting the end-to-end transaction, the applications must typically be configured to communicate directly with the next node in the sequence. This traditional processing mode introduces a number of technical problems. First, if the end-to-end transaction were to fail at one of the applications in the ordered sequence, the end-to-end transaction must be retried starting from the very first step at the first application in the sequence in the absence of a recovery system. Traditional recovery systems may further introduce technical issues, due to the replication of data amongst the disparate applications that is necessary to conduct transaction recovery; the applications increase in size and have synchronization issues with one another, causing a waste of computing resources and network bandwidth. Furthermore, a modification to the functioning of one application in the sequence may necessitate modifying the application code of the adjacent nodes to ensure compatibility.

Accordingly, there is a need for an efficient way to conduct recovery of an end-to-end transaction that allows for state-specific transaction recovery while minimizing duplication of data, thereby increasing computing efficiency.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system for distributing failovers and recovering data, wherein the system comprises a first data center, comprising a plurality of first servers, each comprising a first processor, a memory device, and a communication device, and a first application stored in the memory, comprising computer-readable instructions comprising a first application code portion and a first recovery code portion comprising a common application framework, the first recovery code portion being in communication with the first application code portion via the common application framework. The system further comprises a second data center, comprising a plurality of second servers, each comprising a second processor, a memory device, and a communication device, and a second application stored in the memory, comprising computer-readable instructions comprising a second application code portion and a second recovery code portion comprising the common application framework, the second recovery code portion being in communication with the second application code portion via the common application framework. The first recovery code portion when executed by the first processor causes the first processor to generate a transactional context for a transaction occurring within the first application code portion, the transactional context comprising transactional metadata from the first data center; detect a processing error in a failed first server within the first application code portion; and attempt to correct the processing error according to an escalating series of recovery processes, the escalating series of recovery processes comprising a code-level recovery process, wherein the code-level recovery process corresponds to a processing error having a first level of severity; a local-level recovery process, wherein the local-level recovery process corresponds to a processing error having a second level of severity; and a global-level recovery process, wherein the global-level recovery process corresponds to a processing error having a third level of severity, wherein the global-level recovery process comprises: updating the transactional metadata to include a step at which the transaction failed; and sending, over a network, the transactional context to the second recovery code portion. The second recovery code portion when executed by the second processor causes the second processor to receive, over the network, the transactional context from the first recovery code portion; correct the processing error by attempting to restart the transaction at the step at which the transaction failed; and update the transactional context.

In some embodiments, the systems first recovery code portion is further configured to cause the first processor of the failed server to detect that the processing error has a first level of severity and initiate the code-level recovery process, the code-level recovery process comprising updating the transactional metadata to include the step at which the transaction failed and attempting to restart the transaction within the failed first server from the step at which the transaction failed. In some embodiments, the first recovery code portion is further configured to cause the first processor of the failed server to detect that the code-level recovery process successfully remediated the error and update the transactional context.

In some embodiments, the first recovery code portion is further configured to cause the first processor of the failed server to detect that the code-level recovery process did not successfully remediate the error; determine that the processing error has a second level of severity; and initiate the local-level recovery process, the local-level recovery process comprising updating the transactional metadata to include the step at which the transaction failed; sending, over the network, the transactional context to a non-failed first server within the first application code portion; and causing the first processor within the non-failed first server to attempt to restart the transaction within the non-failed first server from the step at which the transaction failed.

In some embodiments, the first recovery code portion is further configured to cause the first processor of the failed first server to determine that the processing error has a second level of severity and directly initiate the local-level recovery process.

In some embodiments, the first recovery code portion is further configured to cause the first processor of the non-failed first server to detect that the local-level recovery process successfully remediated the error; and update the transactional context.

In some embodiments, the first recovery code portion is further configured to cause the first processor of the non-failed first server to detect that the local-level recovery process did not successfully remediate the error; determine that the processing error has a third level of severity; and initiate the global-level recovery process.

In some embodiments, the first recovery code portion is further configured to cause the first processor of the failed first server to determine that the processing error has a third level of severity and directly initiate the global-level recovery process.

According to one embodiment of the invention, a computer-implemented method for distributing failovers and recovering data between a first data center and a second data center is provided, the method being performed by a first processor of a first server within the first data center, the first server further comprising a memory device and a communication device, wherein a first application is stored on the memory device comprising a first application code portion and a first recovery code portion comprising a common application framework, the first recovery code portion being in communication with the first application code portion via the common application framework. The method is further performed by a second processor of a second server within the second data center, the second server further comprising a memory device and a communication device, wherein a second application is stored on the memory device comprising a second application code portion and a second recovery code portion comprising the common application framework, the second recovery code portion being in communication with the second application code portion via the common application framework. The method comprises configuring the first recovery code portion to cause the first processor to create a transactional context for a transaction, wherein the transactional context comprises transactional metadata from the first data center; detect, via a first recovery code portion of the first data center, a processing error in a failed first server; and attempt to correct the processing error according to an escalating series of recovery processes, the escalating series of recovery processes comprising a code-level recovery process, wherein the code-level recovery process corresponds to a processing error having a first level of severity; a local-level recovery process, wherein the local-level recovery process corresponds to a processing error having a second level of severity; and a global-level recovery process, wherein the global-level recovery process corresponds to a processing error having a third level of severity, wherein the global-level recovery process comprises configuring the first recovery code portion to cause the first processor of the failed first server to update the transactional metadata to include a step at which the transaction failed and send, over a network, the transactional context to the second recovery code portion. The method further comprises configuring the second recovery code portion of the second server to cause the second processor to receive, over the network, the transactional context from the first recovery code portion; correct the processing error by attempting to restart the transaction at the step at which the transaction failed; and update the transactional context.

In some embodiments, the computer-implemented method further includes configuring the first recovery code portion to cause the first processor of the failed first server to detect that the processing error has a first level of severity; and initiate the code-level recovery process, the code-level recovery process comprising updating the transactional metadata to include the step at which the transaction failed and attempting to restart the transaction within the failed first server from the step at which the transaction failed.

In some embodiments, the computer-implemented method further includes configuring the first recovery code portion to cause the first processor of the failed first server to detect that the code-level recovery process successfully remediated the error and update the transactional context.

In some embodiments, the computer-implemented method further includes configuring the first recovery code portion to cause the first processor of the failed first server to detect that the code-level recovery process did not successfully remediate the error; determine that the processing error has a second level of severity; and initiate the local-level recovery process, the local-level recovery process comprising updating the transactional metadata to include the step at which the transaction failed; sending, over the network, the transactional context to a non-failed first server within the first application code portion; and configuring the first processor of the non-failed first server to attempt to restart the transaction within the non-failed first server from the step at which the transaction failed.

In some embodiments, the computer-implemented method further includes configuring the first recovery code portion to cause the first processor of the failed first server to determine that the processing error has a second level of severity and directly initiate the local-level recovery process.

In some embodiments, the computer-implemented method further includes configuring the first recovery code portion to cause the first processor of the non-failed first server to detect that the local-level recovery process successfully remediated the error and delete the transactional context.

In some embodiments, the computer-implemented method further includes configuring the first recovery code portion to cause the first processor of the non-failed first server to detect that the local-level recovery process did not successfully remediate the error; determine that the processing error has a third level of severity; and initiate the global-level recovery process.

In some embodiments, the computer-implemented method further includes configuring the first recovery code portion to cause the first processor of the failed first server to determine that the processing error has a third level of severity and directly initiate the global-level recovery process.

According to an embodiment of the present invention, an innovative system for conducting a state-specific recovery of an end-to-end transaction is provided, comprising an array of nodes arranged in a sequence, the array of nodes comprising at least an upstream node and a downstream node, wherein the upstream node is the first node in the sequence, and wherein the downstream node is the terminal node in the sequence; and a transaction manager, wherein the upstream node comprises an upstream system, which comprises an upstream processor, a memory device, and a communication device, and an upstream application stored in the memory device, comprising computer-readable instructions comprising an upstream application code portion; an upstream recovery code portion; and a common application framework, wherein the upstream recovery code portion is in communication with the upstream application code portion via the common application framework. The downstream node comprises a downstream system, which comprises a downstream processor, a memory device, and a communication device, and a downstream application stored in the memory device, comprising computer-readable instructions comprising a downstream application code portion; a downstream recovery code portion; and the common application framework, wherein the downstream recovery code portion is in communication with the upstream application code portion via the common application framework. The upstream recovery code portion when executed by the upstream processor causes the upstream processor to generate a transactional context, the transactional context comprising a set of metadata, the set of metadata comprising a state of a local transaction within the upstream application and a state of the end-to-end transaction; determine that the local transaction within the upstream application has successfully completed; publish an upstream completion event to the transaction manager, the upstream completion event comprising the state of the end-to-end transaction; and send, over a network, the transactional context to a next node in the sequence. The downstream recovery code portion when executed by the downstream processor causes the downstream processor to receive, over the network, the transactional context from a previous node in the sequence; append, to the metadata, a state of a local transaction within the downstream application; determine that the local transaction within the downstream application has successfully completed; update the state of the end-to-end transaction; publish a downstream completion event to the transaction manager, the downstream completion event comprising the state of the end-to-end transaction; and delete the transactional context.

In some embodiments, the system's array of nodes further comprises a midstream node, the midstream node comprising a midstream system, which comprises a midstream processor, a memory device, and a communication device, and a midstream application stored in the memory device, comprising computer-readable instructions comprising a midstream application code portion; a midstream recovery code portion; and a common application framework, wherein the midstream recovery code portion is in communication with the upstream application code portion via the common application framework. The midstream recovery code portion when executed by the midstream processor causes the midstream processor to receive, over the network, the transactional context from the previous node in the sequence; append, to the metadata, a state of a local transaction within the midstream application; determine that the local transaction within the midstream application has successfully completed; update the state of the end-to-end transaction; publish a midstream completion event to the transaction manager, the midstream completion event comprising the state of the end-to-end transaction; and send, over the network, the transactional context to the next node in the sequence.

In some embodiments, the system's state of the local transaction further comprises a plurality of global steps, the global steps representing various stages of the end-to-end transaction.

In some embodiments, the system's state of the local transaction within the upstream application comprises a plurality of local upstream steps, the local upstream steps representing various stages of the local transaction within the upstream application.

In some embodiments, the system's state of the local transaction within the downstream application comprises a plurality of local downstream steps, the local downstream steps representing various stages of the local transaction within the downstream application.

In some embodiments, the system's state of the local transaction within the midstream application comprises a plurality of local midstream steps, the local midstream steps representing various stages of the local transaction within the midstream application.

In some embodiments, the system's upstream recovery code portion is further configured to cause the upstream processor to detect that the local transaction within the upstream application has failed to successfully complete; publish an upstream error event to the transaction manager, the upstream error event comprising the state of the local transaction within the upstream application and the state of the end-to-end transaction; and restart the local transaction within the upstream application.

In some embodiments, the system's downstream recovery code portion is further configured to cause the downstream processor to detect that the local transaction within the downstream application has failed to successfully complete; publish a downstream error event to the local transaction manager, the downstream error event comprising the state of the transaction within the downstream application and the state of the end-to-end transaction; and restart the local transaction within the downstream application.

In some embodiments, the system's midstream recovery code portion is further configured to cause the midstream processor to detect that the transaction within the midstream application has failed to successfully complete; publish a midstream error event to the transaction manager, the midstream error event comprising the state of the transaction within the midstream application and the state of the end-to-end transaction; and restart the local transaction within the midstream application.

According to one embodiment of the invention, a computer-implemented method for conducting a state-specific recovery of an end-to-end transaction is provided, the method being performed by an upstream processor of an upstream system within an upstream node, the upstream system comprising a memory device and a communication device, wherein an upstream application is stored on the memory device comprising an upstream application code portion; an upstream recovery code portion; and a common application framework, wherein the upstream recovery code portion is in communication with the upstream application code portion via the common application framework. The method is further performed by a downstream processor of a downstream system within a downstream node, the downstream system comprising a memory device and a communication device, wherein a downstream application is stored on the memory device comprising a downstream application code portion; a downstream recovery code portion; and the common application framework, wherein the downstream recovery code portion is in communication with the upstream application code portion via the common application framework. The method comprises configuring the upstream recovery code portion to cause the upstream processor to generate a transactional context within the upstream recovery code portion, the transactional context comprising a set of metadata, the set of metadata comprising a state of a local transaction within the upstream application and a state of the end-to-end transaction; determine that the local transaction within the upstream application has successfully completed; publish an upstream completion event to a transaction manager, the upstream completion event comprising the state of the end-to-end transaction; and send, over a network, the transactional context to a next node in a sequential array of nodes. The method further comprises configuring the downstream recovery code portion to cause the downstream processor to receive the transactional context over the network; append, to the set of metadata, a state of a local transaction within the downstream application; determine that the local transaction within the downstream application has successfully completed; update the state of the end-to-end transaction; publish a downstream completion event to the transaction manager, the downstream completion event comprising the state of the end-to-end transaction; and delete the transactional context.

In some embodiments, the next node in the sequential array of nodes is a midstream node, the midstream node comprising a midstream system, which comprises a midstream processor, a memory device, and a communication device, and a midstream application stored in the memory device, comprising computer-readable instructions comprising a midstream application code portion a midstream recovery code portion; and the common application framework, wherein the midstream recovery code portion is in communication with the upstream application code portion via the common application framework. The midstream recovery code portion is configured to cause a midstream processor to receive, over the network, the transactional context from the previous node in the sequence; append, to the metadata, a state of a local transaction within the midstream application; determine that the local transaction within the midstream application has successfully completed; update the state of the end-to-end transaction; publish a midstream completion event to the transaction manager, the midstream completion event comprising the state of the end-to-end transaction; and send, over the network, the transactional context to the next node in the sequence.

In some embodiments, the state of the end-to-end transaction in the computer-implemented method comprises a plurality of global steps, the global steps representing various stages of the end-to-end transaction.

In some embodiments, the state of the local transaction within the upstream application in the computer-implemented method comprises a plurality of local upstream steps, the local upstream steps representing various stages of the transaction within the upstream application.

In some embodiments, the state of the local transaction within the downstream application in the computer-implemented method comprises a plurality of local downstream steps, the local downstream steps representing various stages of the transaction within the downstream application.

In some embodiments, the state of the local transaction within the midstream application in the computer-implemented method comprises a plurality of local midstream steps, the local midstream steps representing various stages of the transaction within the midstream application.

In some embodiments, the computer-implemented method further includes configuring the upstream recovery code portion to cause the upstream processor to detect that the local transaction within the upstream application has failed to successfully complete; publish an upstream error event to the transaction manager, the upstream error event comprising the state of the local transaction within the upstream application and the state of the end-to-end transaction; and restart the local transaction within the upstream application.

In some embodiments, the computer-implemented method further includes configuring the downstream recovery code portion to cause the downstream processor to detect that the local transaction within the downstream application has failed to successfully complete; publish a downstream error event to the transaction manager, the downstream error event comprising the state of the local transaction within the downstream application and the state of the end-to-end transaction; and restart the local transaction within the downstream application.

In some embodiments, the computer-implemented method further includes configuring the midstream recovery code portion to cause the midstream processor to detect that the local transaction within the midstream application has failed to successfully complete; publish a midstream error event to the transaction manager, the midstream error event comprising the state of the local transaction within the midstream application and the state of the end-to-end transaction; and restart the local transaction within the midstream application.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
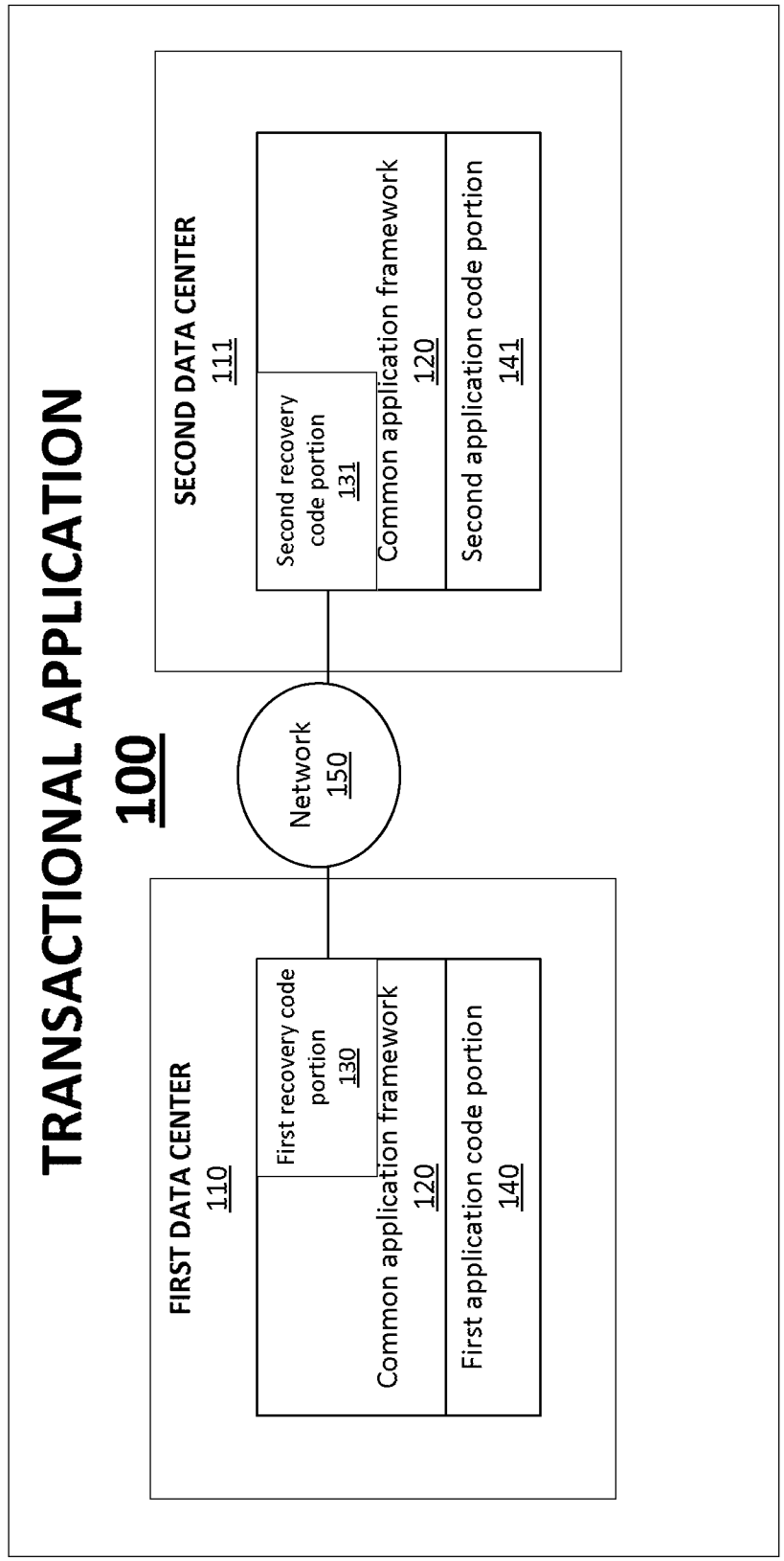
Figure 2:
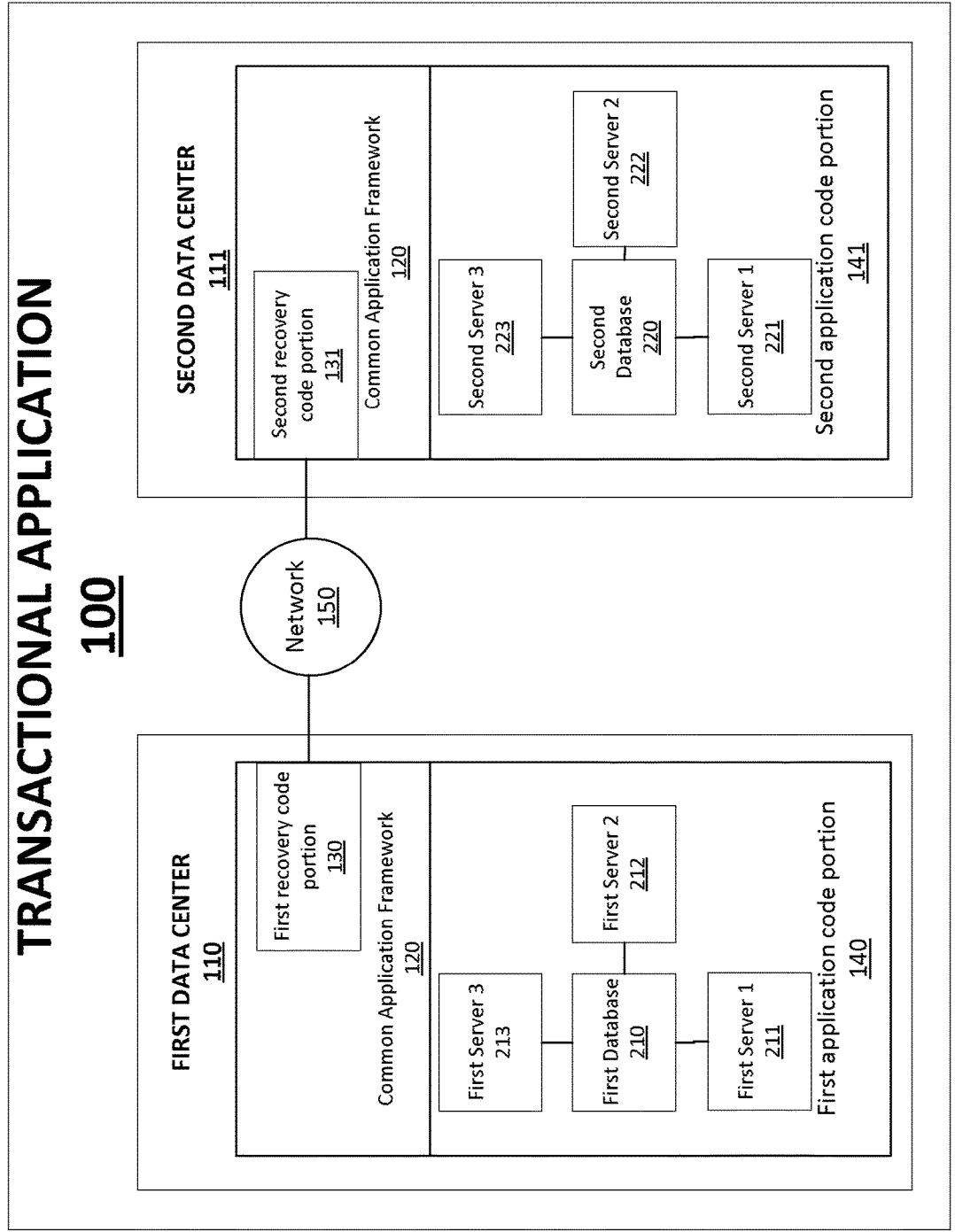
Figure 3:
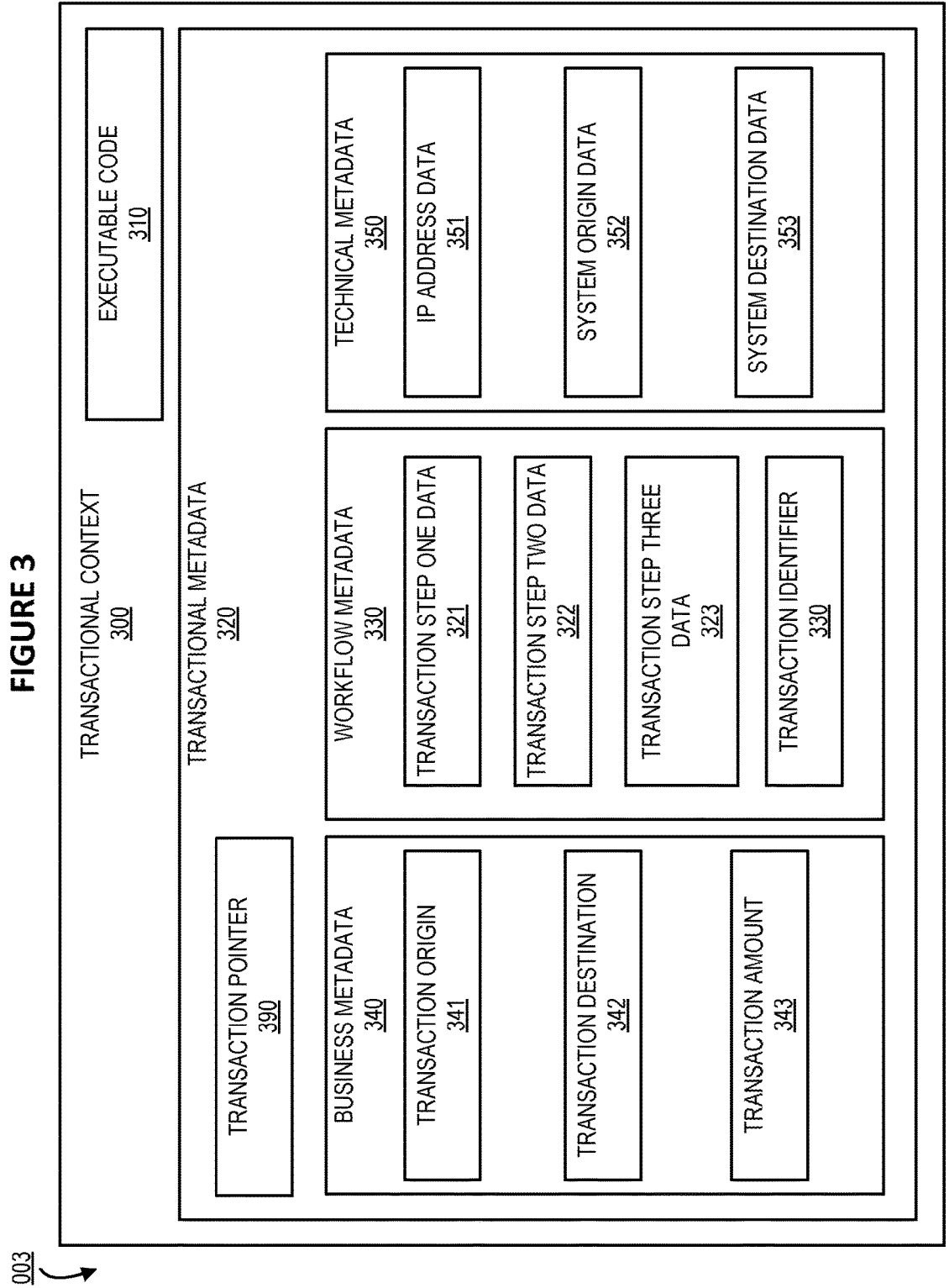
Figure 4:
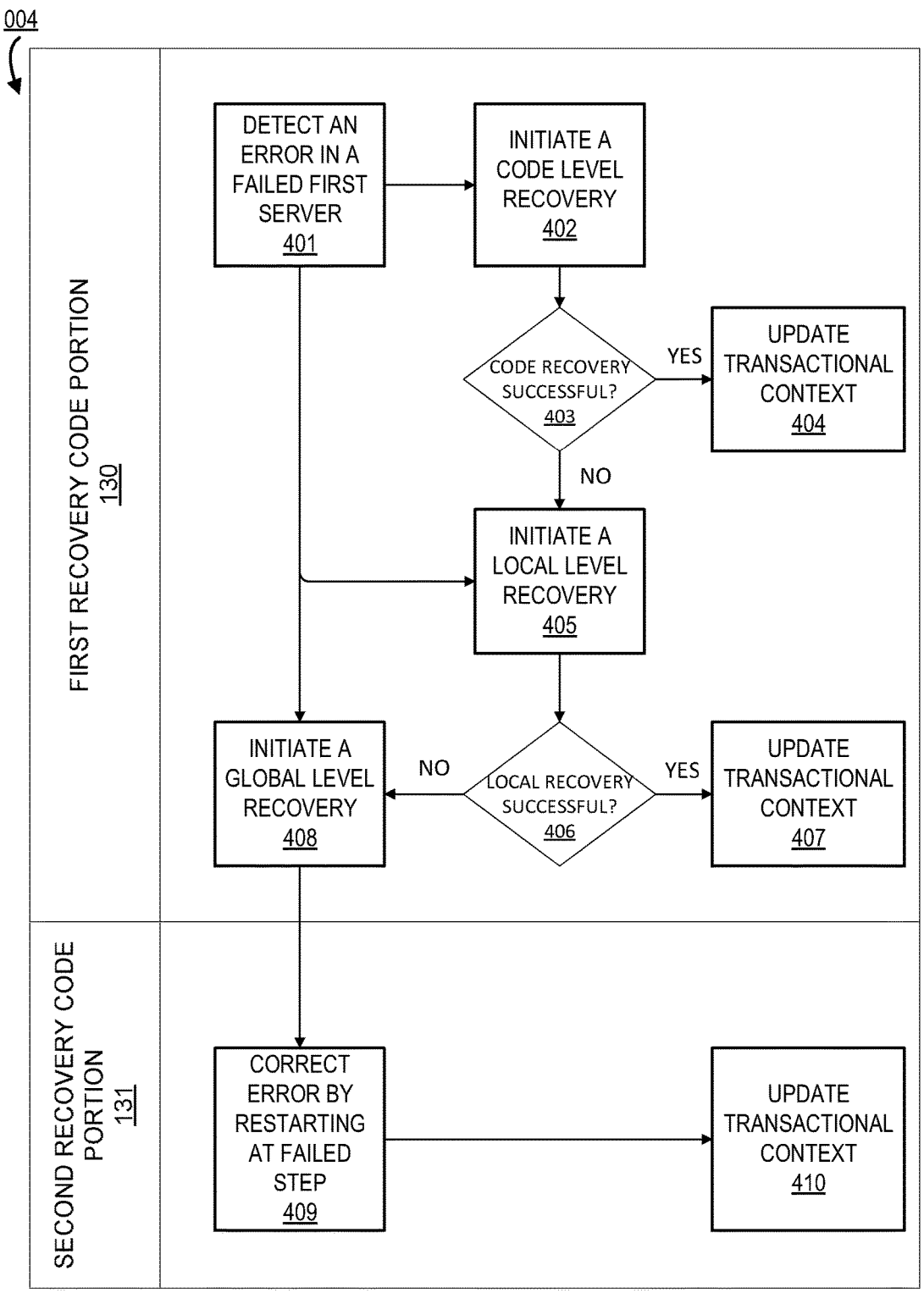
Figure 9:
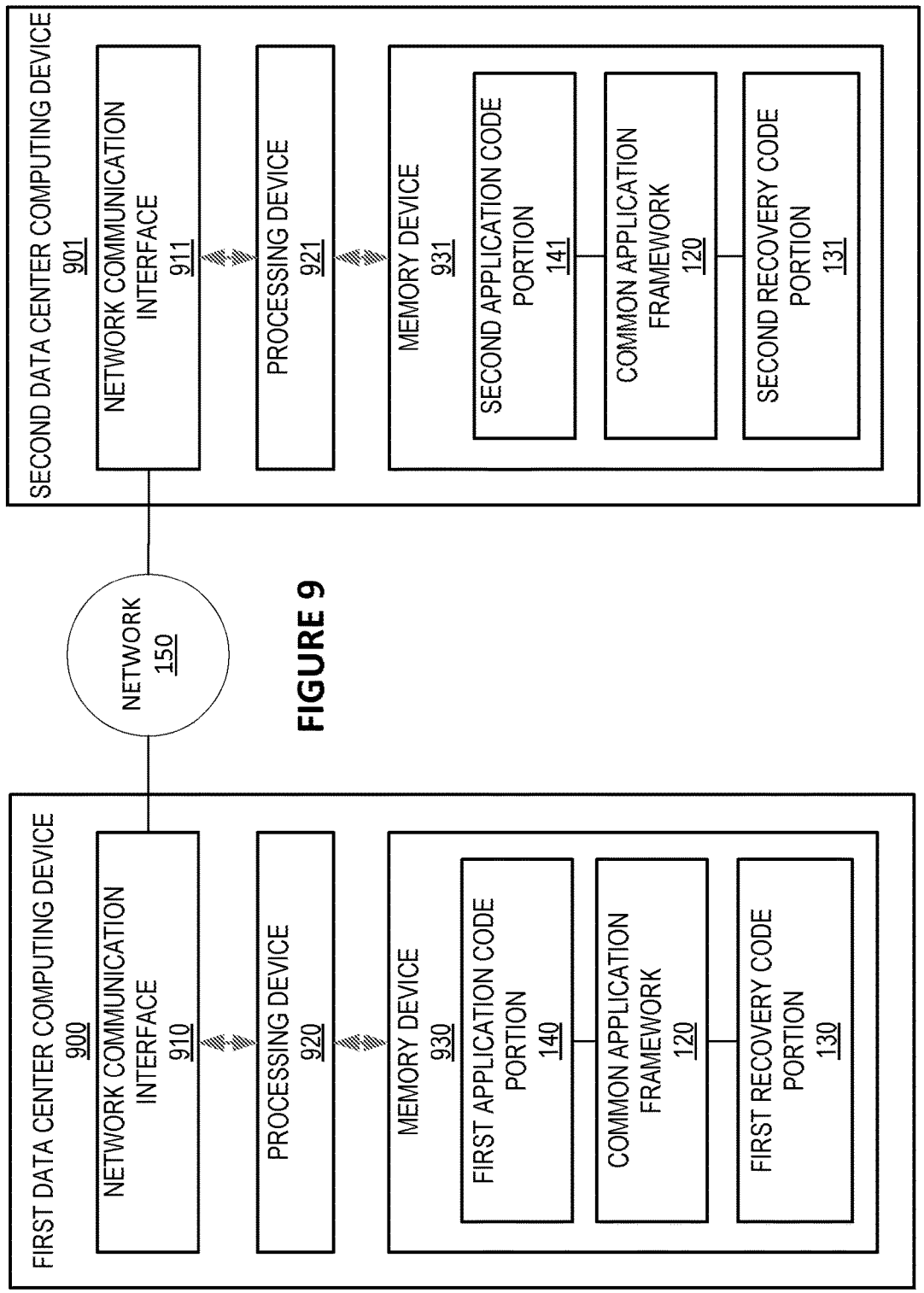
Figure 10:
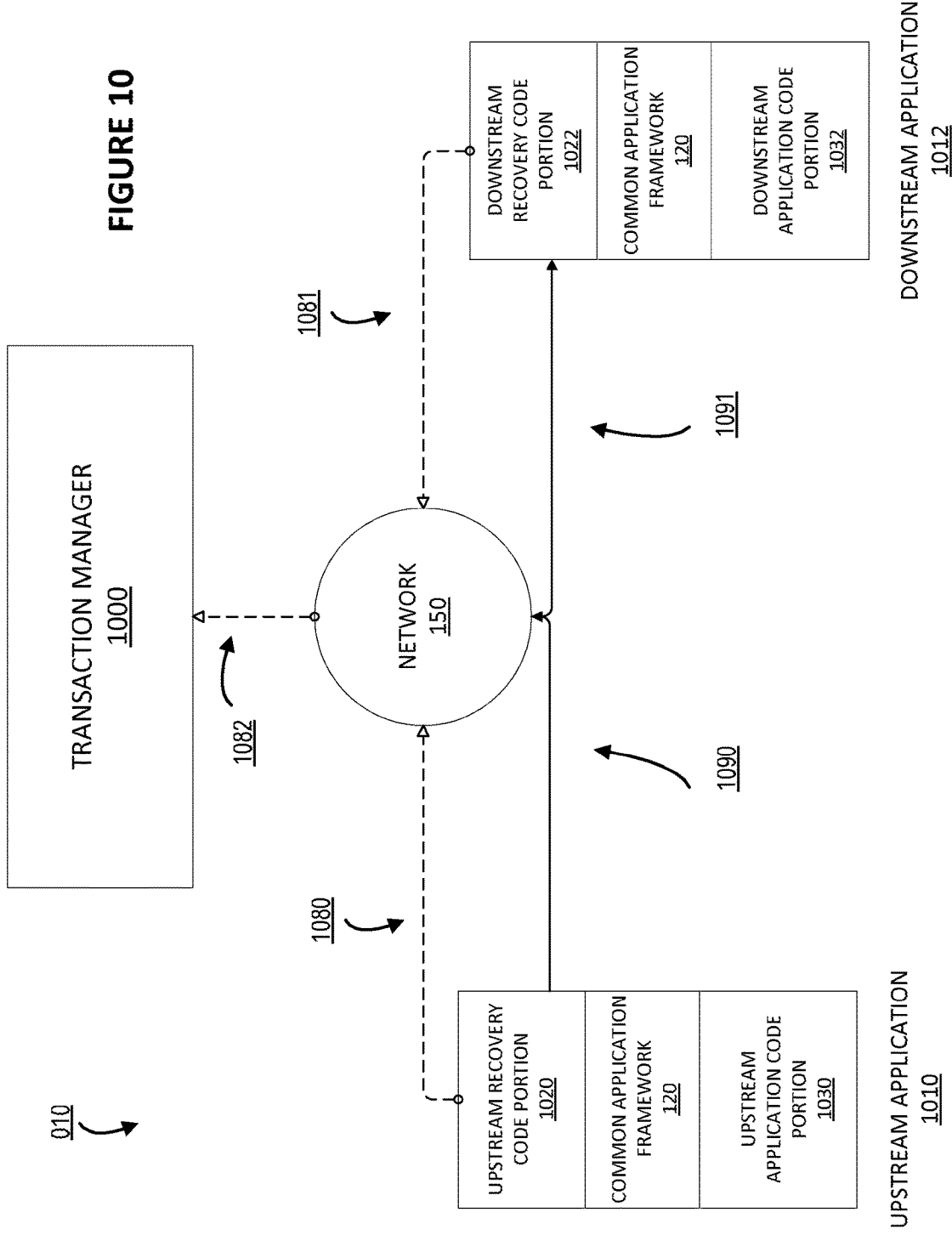
Figure 11:
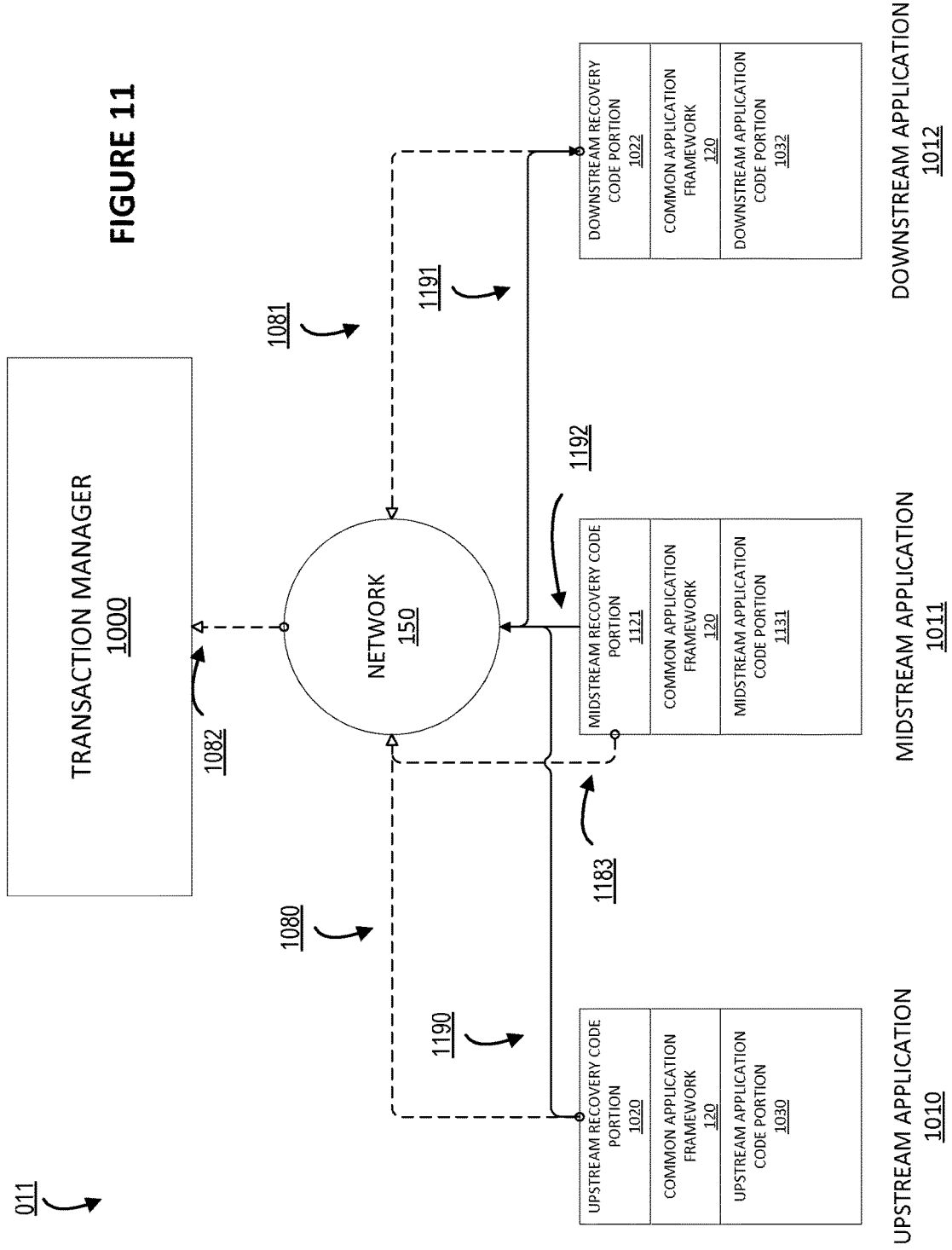
Figure 12:
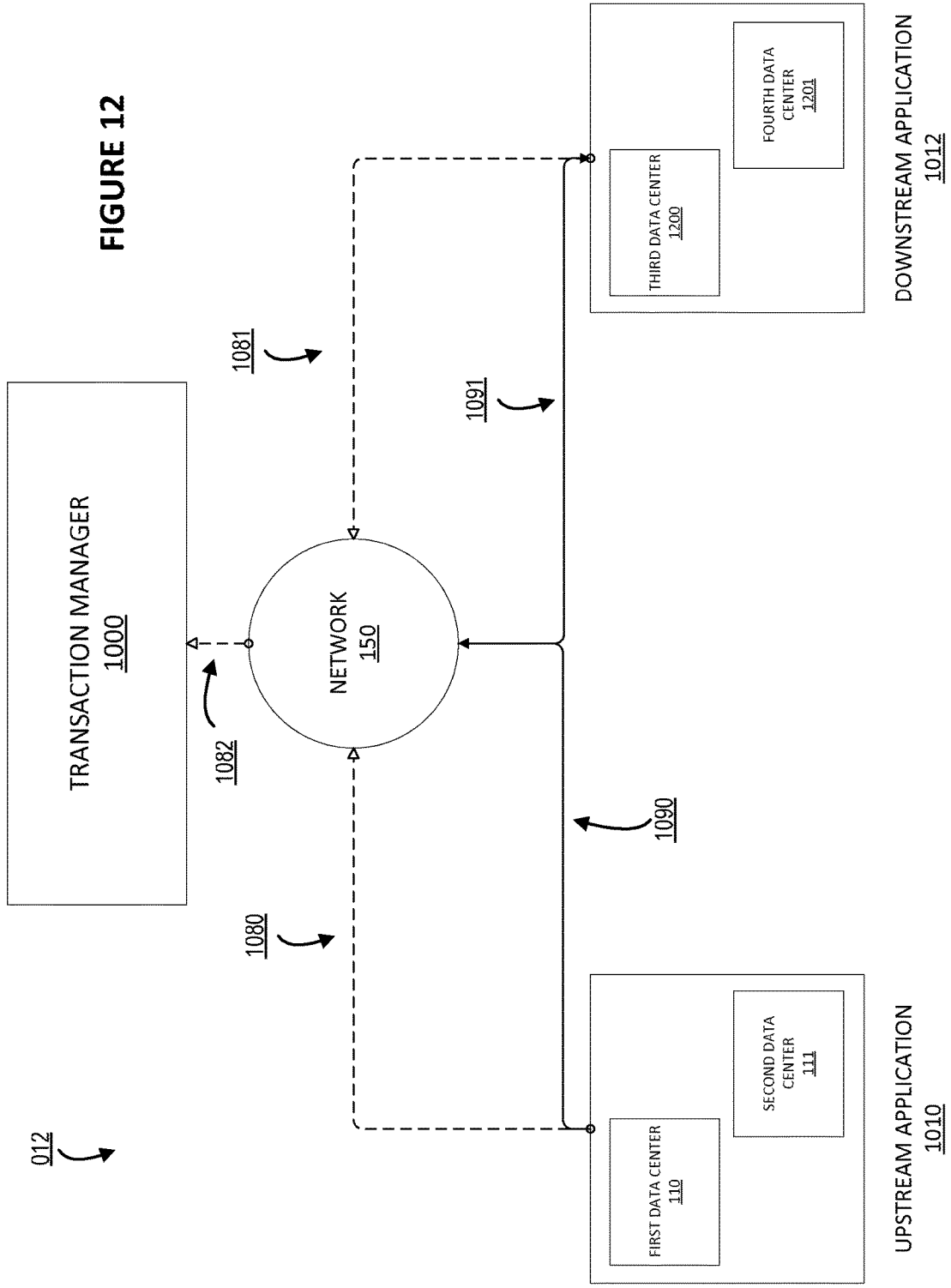
Figure 13:
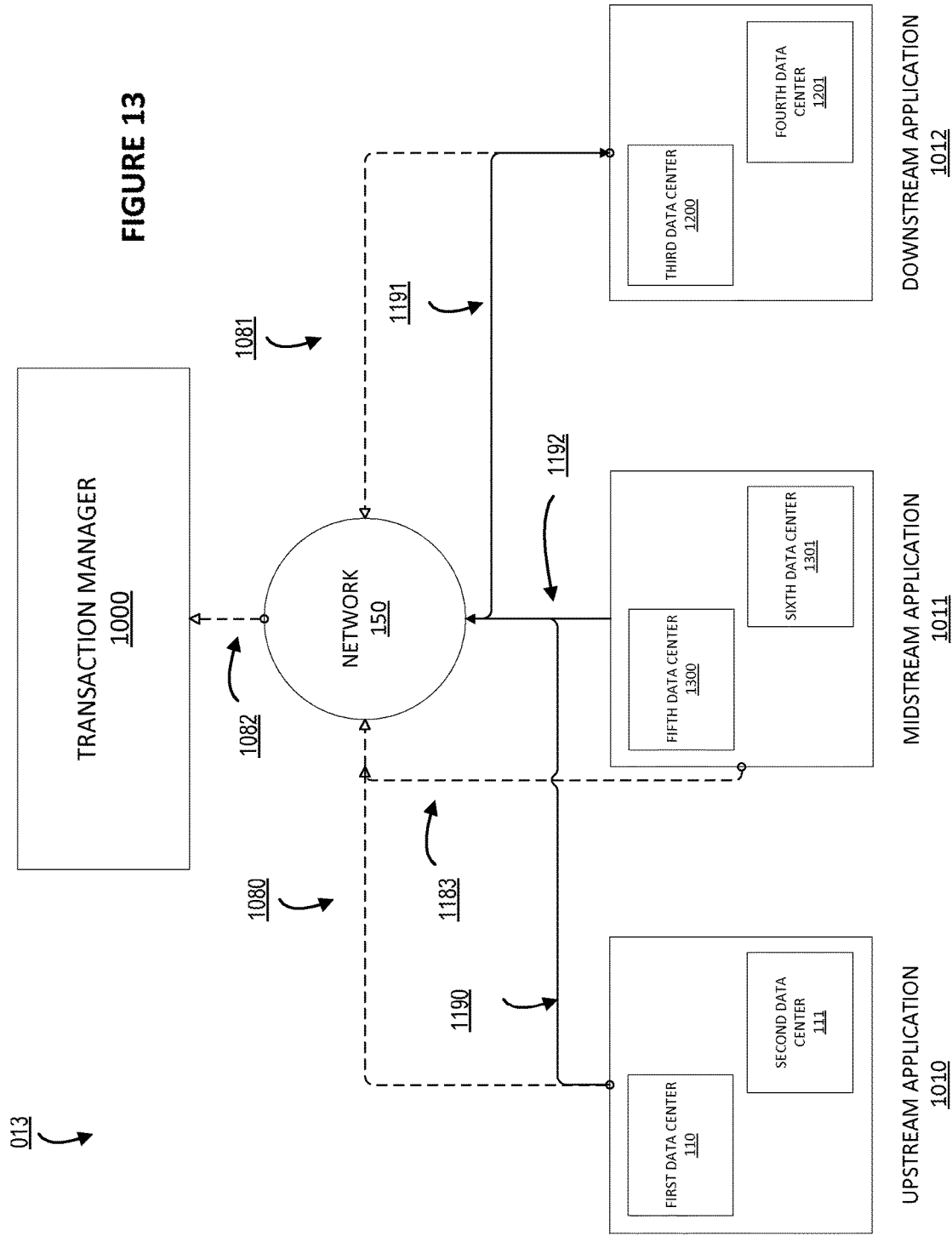
Figure 14:
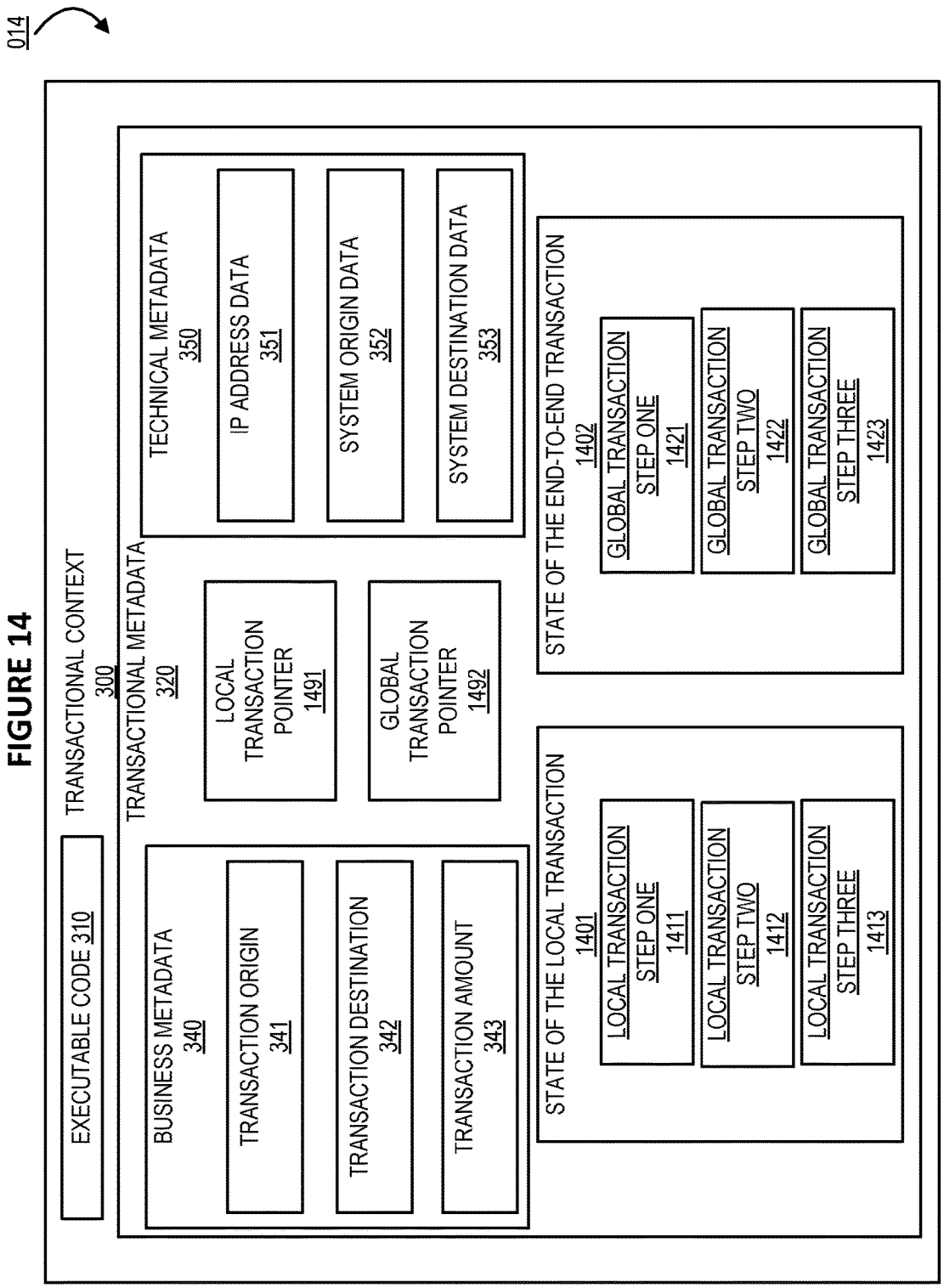

Having thus described embodiments of the invention in general terms, reference will now be made to the accompanying drawings, wherein:

FIG. 1 is a block diagram illustrating a high level overview of a system for increasing intra-application efficiency by distributed failover, according to embodiments of the invention;

FIG. 2 is a block diagram illustrating the individual logical/physical structures within the data center, according to embodiments of the invention;

FIG. 3 is a block diagram illustrating the contents of the transactional context, according to embodiments of the invention;

FIG. 4 is a combination block and process flow diagram illustrating a process for conducting recovery according to an escalating series of levels, according to embodiments of the invention;

FIG. 5 is a process flow diagram illustrating a method of detecting and carrying out a code-level recovery process, according to embodiments of the invention;

FIG. 6 is a process flow diagram illustrating a method of detecting and carrying out a local-level recovery process, according to embodiments of the invention;

FIG. 7 is a process flow diagram illustrating a method of detecting and carrying out a code-level recovery process, according to embodiments of the invention;

FIG. 8 is a symbol diagram illustrating the hardware devices within the system, according to embodiments of the invention;

FIG. 9 is a block diagram illustrating the breakdown of devices within the system, according to embodiments of the invention;

FIG. 10 is a block diagram illustrating an overview of a system for tracking and recovering end-to-end transactions between applications, according to embodiments of the invention;

FIG. 11 is a block diagram illustrating another embodiment of the system for tracking and recovering an end-to-end transaction, according to embodiments of the invention;

FIG. 12 is a block diagram illustrating the physical/logical partitions within the nodes in the array, according to embodiments of the invention;

FIG. 13 is a block diagram illustrating another embodiment of the physical/logical partitions within the nodes in the array, according to embodiments of the invention;

FIG. 14 is a block diagram illustrating a transactional context to be used for tracking and recovering end-to-end transactions, according to embodiments of the invention;

FIG. 15 is a process flow diagram illustrating a method for conducting end-to-end transaction recovery, according to embodiments of the invention; and FIG. 16 is a block diagram illustrating the individual physical/logical components within the computing devices of the nodes in the system, according to embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Embodiments of the present invention provide a system for increasing intra-application efficiency by way of distributed failover. The embodiments solve the computer networking-centric problems discussed above by allowing data centers within an application to perform error recovery of failed transactions by shifting the processing load to another data center in the network without data redundancy amongst the data centers within the application. Avoiding the duplication of data within the data centers greatly reduces the amount of computing resources required to perform recovery and maintain service uptime, including, but not limited to, processing power, memory space, storage space, cache space, electric power, networking bandwidth, and I/O calls. Thus, embodiments of the invention provide for improving processing efficiencies of the various systems running applications utilizing the non-data redundant failover system because various processing steps traditionally required in networked systems have been eliminated, such as, communication initiation messaging steps, communication protocol standardization steps and the like.

Embodiments of the present invention also provide a system for increasing inter-application efficiency by conducting recovery of end-to-end transactions. The embodiments solve the computer networking-centric problems discussed above by allowing a transaction manager to track the status of a transaction being processed by a plurality of nodes in an array in order to perform error recovery of failed transactions within a node. The recovery process may involve restarting the transaction at the global step and the local step at which the transaction failed. By avoiding restarting the end-to-end transaction from the first step, the system may save precious computing resources of the computer systems within the nodes processing the end-to-end transaction, including, but not limited to, processing power, memory space, storage space, cache space, electric power, networking bandwidth, and I/O calls. Thus, embodiments of the invention provide for improving processing efficiencies of the various systems running applications utilizing the end-to-end transaction recovery system because various processing steps traditionally required in networked systems have been eliminated, such as, communication initiation messaging steps, communication protocol standardization steps and the like.

Embodiments of the invention employ a common application framework, which allows the application code portions with the data centers to remain independent and to be maintained separately from recovery code portions. In such embodiments, the application code portion communicates only with the common application framework, which in turn communicates with the recovery code portion. In this way, the application code portions of the different data centers may execute different functions from one another while simultaneously relying on one another to distribute recovery functions.

Embodiments of the invention employ a recovery code portion to exclusively manage all recovery functions within the data center. In such embodiments, it is not necessary to specifically program the application code portion to conduct recovery with either a different server within the data center or with another data center on the network; instead, the application code portion is configured to conduct its recovery through the recovery code portion. In this way, the application code portion is not "aware" of which components are conducting the recovery processing.

Embodiments of the invention employ a transactional context to be sent from one data center to another when coordinating the transaction recovery. In some embodiments, the transactional context comprises metadata relating to the transaction. In some embodiments, the recovery code portions are configured to conduct recovery processing solely based on what is read from the metadata.

"Application code portion" refers broadly to a computer-executable program configured to execute certain functions. In some embodiments, the application code portion may be a program for validating payments for a financial institution. In other embodiments, the application code portion may be a program for processing payments for a financial institution.

"Common application framework" refers to computer code that serves as an infrastructure for integrating applications and services. The common application framework serves as the "plumbing" for its integrated components and handles low-level tasks such as those that relate to data pathways and communication between components.

"Failed server" refers to the server on which a transaction error has occurred. "Non-failed server" refers to a server other than the failed server.

"Recovery code portion" refers to computer code that manages and coordinates recovery of processing errors within the data center. In some embodiments, the recovery code portion may coordinate transaction recovery by resolving the error within the data center. In some embodiments, the recovery code portion may coordinate transaction recovery by employing a second data center to carry out the recovery processing.

"Data center" refers to a system or amalgam of systems for conducting processing of data.

"Transaction" as used herein refers to a data processing flow taking place within a data center.

"Transactional context" as used herein refers to a set of data compiled by the recovery code portion to be used in the recovery process.

FIG. 1 is a block diagram providing an overview of a system 001 for increasing intra-application efficiency by way of distributed failover according to one embodiment of the invention. The system comprises a first data center 110, which comprises a common application framework 120 with a first application code portion 140 and a first recovery code portion 130 operatively coupled to the common application framework 120. The system further comprises a second data center 111, which comprises the common application framework 120 with a second application code portion 141 and a second recovery code portion 131 operatively coupled to the common application framework 120. The first recovery code portion 130 is in communication with the second recovery code portion 131 over a network 150. Both the first data center and the second data center are components of an overarching transactional application 100. In some embodiments, the first application code portion 140 is distinct from the second application code portion 141 in configuration and function.

The network 150 may be a system specific distributive network receiving and distributing specific network feeds and identifying specific network associated triggers. The network 150 may also be a global area network (GAN), such as the Internet, a wide area network (WAN), a local area network (LAN), or any other type of network or combination of networks. The network 150 may provide for wireline, wireless, or a combination wireline and wireless communication between devices on the network 150. Accordingly, in some embodiments, the first data center 110 may exist in close proximity to the second data center 111. In some embodiments, the first data center 110 may be located on the opposite side from the earth as the second data center 111.

In some embodiments, transactional application 100 is an application that is in communication with the data centers 110 and 111 and coordinates the functionality of the data centers 110 and 111 over the network 150. In some embodiments, the transactional application 100 may be a web-based portal for managing worldwide transactions occurring between the data centers 110 and 111.

In some embodiments, the first data center 110 may have local recovery rules that are distinct from the local recovery rules of the second data center 111. For example, in some embodiments, the first data center 110 may request the second data center 111 to perform a first set of recovery functions based on the first data center's recovery rules. In other embodiments, the second data center 111 may request the first data center 110 to perform a second set of recovery functions based on the second data center's recovery rules.

The mode of communication over a network can be accomplished through any number of network protocols used to receive and transmit data, including, but not limited to, IBM Message Queue (MQ), Hyper Text Transfer Protocol (HTTP), Secure Hyper Text Transfer Protocol (HTTPS), Post Office Protocol (POP), Internet Message Access Protocol (IMAP), File Transfer Protocol (FTP), Secure File Transfer Protocol (SFTP), Point to Point Protocol (PPP), or Real-Time Publish Subscribe (RTPS) protocol. Accordingly, "set of data" may include a request for a file transfer, an electronic message, e-mail, a request for further processing, and the like.

FIG. 2 is a block diagram illustrating the logical/physical layout of the system 002 according to one embodiment of the invention. In some embodiments, the system as illustrated in FIG. 1 further comprises a first database 210 and a plurality of first servers 211, 212, and 213 within the first application code portion 140. In some embodiments, the system further comprises a second database 220 and a plurality of second servers 221, 222, and 223 within the second application code portion 141.

In some embodiments, the data within the first database 210 is not replicated within the second database 220. In some embodiments, the first recovery code portion 130 is configured to detect a processing error occurring within one of the first servers 221, 222, or 223. In some embodiments, the first recovery code portion 130 may determine that the cause of the error is a problem within the first database 210. In some embodiments, the first recovery code portion 130 may determine that the cause of the error is a problem within one of the first servers 221, 222, or 223.

FIG. 3 is a block diagram illustrating the contents of the transactional context 300 used by the system 003 as described in FIGS. 1 and 2 for transaction recovery, according to one embodiment of the invention. In some embodiments, the transactional context comprises transactional metadata 320. In some embodiments, the transactional metadata 320 comprises a record of the state of the transaction within a single data center 110 or 111 as described by the workflow metadata 330, which comprises transaction step data 321, 322, and 323. The transaction step data 321, 322, and 323 may signify the processing success or failure of a plurality of steps in a transaction. In some embodiments, the transaction step data 321, 322, and 323 may be used to restart the transaction at the specific step at which the transaction has failed. In some embodiments, the workflow metadata 330 may be updated by the systems upon successful completion of each step in the transaction.

In some embodiments, the transactional metadata 320 may further comprise technical metadata 350. The technical metadata 350 includes information regarding the systems and devices involved in the transaction, such as IP address data 351 of the systems, system origin data 352 signifying the system from which the transaction originated, and the system destination data 353 signifying the intended system end point of the transaction.

In some embodiments, the transactional metadata 320 may further comprise business metadata 340. The business metadata 340 includes information regarding the business aspects of the transaction, such as the transaction origin 341 indicating the source of resources to be transferred, the transaction destination 342 indicating the intended recipient of the resources, and the transaction amount 343 indicating the amount of resources to be allocated.

In some embodiments, the transactional metadata 320 may further comprise a transaction pointer 390, which directs the recovery code portions to the current step of the transaction 321, 322, 323. In some embodiments, the transactional context 300 may further comprise executable code 310, which provides executable instructions for conducting the recovery to the recovery code portions 130, 131 of the data centers 110, 111 within the transactional application 100. In such an embodiment, the recovery code portion 130, 131 may not necessarily contain code that specifically details how to process the transactional context 300. In some embodiments, the executable code 310 may be absent from the transactional context 300, in which case the recovery code portions 130, 131 may be configured to be directly compatible with the transactional context 300. In some embodiments, the transactional metadata 320 may further comprise a transaction identifier 330 that allows the recovery code portions 130, 131 to uniquely identify a transaction occurring within a single data center 110 or 111. In some embodiments, the transactional metadata 320 may further comprise key-value pairs. In some embodiments, the transactional context is persistent in memory until it is no longer needed, at which point the transactional context is deleted.

FIG. 4 is a combination block and process flow diagram illustrating a method 004 for conducting recovery by failover through a series of escalating steps corresponding to levels of error severity, according to one embodiment of the invention. The process begins at block 401 within the first recovery code portion 130, by detecting an error in a first fail server. In some embodiments, the first recovery code portion 130 may start the recovery process from the lowest level of severity in the escalating series of recovery steps by default, proceeding to block 402. In some embodiments, the first recovery code portion 130 may be configured to detect the nature of the error occurring in the failed first server and directly escalate the level of severity, proceeding directly to block 405 or 408.

In some embodiments, the first recovery code portion 130 proceeds to block 402, by initiating a code level recovery 402. In some embodiments, the code level recovery 402 corresponds to the lowest level of error severity, and comprises retrying the transaction within the first failed server beginning from the step at which the transaction failed. In some embodiments, the code level recovery 402 comprises creating a transactional context and appending transactional metadata to the transactional context.

In such an embodiment, the process continues to block 403, by determining whether the code level recovery has been successful in remediating the error. In some embodiments, the first recovery code portion 130 determines that the code level recovery has successfully remediated the error and proceeds to block 404, by updating the transactional context to reflect successful transaction recovery. In some embodiments, the first recovery code portion 130 determines that the code level recovery has not successfully remediated the error, and proceeds to block 405, by initiating a local level recovery.

In some embodiments, the local level recovery comprises appending transactional metadata to the transactional context and sending the transactional context to a non-failed first server within the data center. The non-failed first server may read the transactional metadata to determine the step at which the transaction failed, and subsequently attempt to retry the transaction at the step at which the transaction failed. In some embodiments, the condition that necessitates the local level recovery may be a failure in communication between the failed first server and the first database. In some embodiments, the condition may be a latency issue between the failed first server and the database. In some embodiments, the local level recovery comprises attempting to access the first database on behalf of the first failed server. In other embodiments, the local level recovery comprises attempting to complete the transaction based solely on the transactional metadata within the transactional context.

The process continues to block 406, by the first recovery code portion 130 determining whether the local level recovery has successfully remediated the error. In some embodiments, the first recovery code portion 130 determines that the local level recovery has successfully remediated the error and proceeds to block 407, by updating the transactional context to reflect successful transaction recovery. In some embodiments, the first recovery portion 130 determines that the local level recovery has not successfully remediated the error and proceeds to block 408, by initiating a global level recovery.

In some embodiments, the condition that necessitates a global level recovery is a transaction failure within the data center. In some embodiments, the condition may be the unavailability of the first database, due to a systems failure of the first database, or a temporary disconnect of the first database from the network. In some embodiments, the condition may be a transaction failure within each of the first servers caused by hardware or software malfunctions.

The process continues to block 409, by the second recovery code portion reading the transactional metadata within the transactional context, determining the step at which the transaction failed within the transactional metadata, and correct the error by using the transactional metadata to restart the transaction at the step at which the transaction failed. In some embodiments, the correction of the error is accomplished by using the resources of the second data center. In some embodiments, the second recovery code portion may cause the second data center to fully complete the transaction in the place of the first data center. In some embodiments, the second data center may pass the transaction back to the first data center after recovering from the processing error.

Finally, the process continues to block 410, by updating the transactional context to reflect successful transaction recovery.

FIG. 5 is a process flow diagram illustrating a method 005 for conducting a code-level recovery, according to one embodiment of the invention. The process begins at block 501, by detecting that a processing error within the first data center has a first level of severity. In some embodiments, the system may be configured to initially treat every processing error as having a first level of severity. In some embodiments, the system may be configured to detect that the error has a first level of severity based on the nature of the error.

The process continues to block 502, by updating the transactional context to include the step at which the transaction failed. In such embodiments, the transactional context has already been created and exists in memory. In some embodiments, the transactional context will comprise executable code to maximize compatibility with other data centers. In some embodiments, the transactional context will not contain executable code, in order to reduce data size and minimize memory space requirements.

The process continues to block 503, by initiating a code-level recovery process, during which the process proceeds to block 504, by attempting to restart the transaction within the failed first server starting from the step at which the transaction failed. For example, if the error occurred at Step 3 in the transaction, the recovery process will attempt to skip Steps 1 and 2, and directly retry Step 3. The system accomplishes this by using the transaction pointer to read the workflow metadata. In this way, the system may prevent the computing resource-intensive step of completely restarting the transaction from the beginning. Upon successful completion of the transaction recovery, the process concludes at block 505 by updating the transactional context upon successful recovery of the transaction. In some embodiments, the updates may include changing the workflow metadata to reflect successful completion of the steps in the transaction. In some embodiments, the updates may further include updates to the technical metadata, including changes to the information regarding systems involved in the transaction.

FIG. 6 is a process flow diagram illustrating a method 006 of carrying out a local-level recovery process through the first recovery code portion, according to one embodiment of the invention. The process begins at block 601, by detecting that the error has a second level of severity. In some embodiments, an error is considered to have a second level of severity after it has been elevated from a first level of severity. In some embodiments, an error is directly elevated to the second level of severity depending on the nature of the error. In some embodiments, an error may have a second level of severity caused by a failure in communication between the failed server and the database.

The process continues to block 602, by initiating a local-level recovery process, through which the process continues to block 603, by updating the transactional context to include the step at which the transaction failed. In some embodiments, the update includes changing the transactional pointer to indicate the step at which the transaction failed. In this way, other systems will be able to resume the transaction starting from the step at which the transaction failed while skipping the steps that were successfully completed. The process then proceeds to block 604, by sending the transactional context to a non-failed first server within the first data center. In such an embodiment, a "non-failed" server is a server other than the one in which the error occurred. In some embodiments, the "non-failed" server may be an alternate server that exists within the same data center as the failed server.

The process proceeds to block 605, by attempting to restart the transaction within a non-failed first server from the step at which the transaction failed. In some embodiments, the non-failed first server will fully complete the transaction on behalf of the failed first server. In such an embodiment, the non-failed first server assumes "ownership" of the transaction and the transactional context. In some embodiments, the non-failed first server will pass the transaction back to the failed first server upon remediating the processing error and verifying that the underlying condition for the error has been rectified.

The process then concludes at block 606, by updating the transactional context upon successful transaction recovery. In some embodiments, this may include updating the technical metadata to reflect a change in the systems involved in the transaction, which may include the non-failed first server.

FIG. 7 is a process flow diagram illustrating a method 007 for performing a global-level recovery of an error within a first data center by using a second data center. The process begins at block 701, by detecting that the processing error has a third level of severity. In some embodiments, the error will have a third level of severity if it has been elevated from a first level of severity during a code-level recovery process, or a second level of severity from a local-level recovery process. In some embodiments, the error may have been directly elevated to a global-level recovery depending on the nature of the error within the first data center. In some embodiments, an error may have a third level of severity if the database within the first data center is unavailable, causing a connection failure of all of the first servers to the first database.

The process continues to block 702, by initiating a global-level recovery process, through which the process continues to block 703, by updating the transactional context to include the step at which the transaction failed within the first data center. In some embodiments, this may include updating the transaction pointer to direct other systems to the step at which the transaction failed. The process then continues to block 704, by sending the transactional context to the second data center via the second recovery code portion over the network.

The process continues to block 705, by receiving the transactional context at the second recovery code portion within the second data center. The process further continues to block 706, by correcting the processing error by attempting to restart the transaction at the step at which the transaction failed. In some embodiments, the second recovery portion attempts to correct the error based solely on the transactional metadata within the transactional context. In some embodiments, the second recovery portion may run the executable code within the transactional context to conduct the recovery. In some embodiments, the second data center may read the business data, technical data, and workflow data to resume the transaction from the step at which the transaction failed while skipping the steps which were successfully completed. In some embodiments, the second recovery code portion conducts the recovery within one of the second servers. In some embodiments, the second recovery code portion conducts the recovery within a dedicated recovery device.

Finally, the process proceeds to block 707, by updating the transactional metadata upon successful transaction recovery. In some embodiments, the second data center may fully complete the transaction according to the metadata within the transactional context. In such an embodiment, the second data center may update the technical metadata to change the information regarding the systems and devices involved in the transaction to include the systems within the second data center. In such an embodiment, a system within the second data center may receive "ownership" of the transaction and complete the transaction on behalf of the first data center. In other embodiments, the second data center may only carry out the step at which the transaction failed, then pass the transaction back for the first data center to complete, after verifying that the underlying condition causing the error having a third level of severity has been successfully rectified.

FIG. 8 is a symbol diagram that illustrates the hardware involved in the distributed failover system 008 according to one embodiment of the invention. A first data center 110 is in operative communication with a second data center 111 via a network 150. In some embodiments, the first data center 110 further comprises a first database computing device 810 and a plurality of first server computing devices 811, 812, 813 operatively coupled to the network 150. In some embodiments, the second data center further comprises a second database computing device 820 and a plurality of second server computing devices 821, 822, 823 operatively coupled to the network 150. In some embodiments, each of the servers may comprise the recovery code portion. In another embodiment, the recovery code portion may be stored on another computing device within the data center. It should be understood that "computing device" may be any device capable of performing processing functions and thus encompasses a broad range of devices, including, but not limited to, personal desktop computers, laptop computers, servers, routers, smartphones, digital tablets, smart watches, smart appliances, ATM's, and the like.

FIG. 9 is a block diagram illustrating the breakdown of the combination of hardware and software involved in the system 009 according to one embodiment of the invention. A first data center computing device 901 comprises a network communication interface 910 operatively coupled to a processing device 920, which is operatively coupled to a memory device 930, the memory device 930 comprising a first application code portion 140 and a first recovery code portion 130 operatively coupled to the common application framework 120. The network communication interface 910 contains devices that allow the first data center computing device 900 to connect to the network 150.

The first data center computing device 900 is, through the network 150, in operative communication with the second computing device 901, which comprises a network communication interface 911 that is operatively coupled to a processing device 921, which is operatively coupled to a memory device 931, the memory device 931 comprising the second application code portion 141 and the second recovery code portion 131 operatively coupled to the common application framework 120. In some embodiments, the memory device is a non-transitory computer-readable medium. In some embodiments, the memory device may be a high-bandwidth computer storage medium, such as random-access memory (RAM). In such embodiments, the memory device further comprises the transactional context. In some embodiments, the memory device medium may be a hard drive.

FIG. 10 is a block diagram illustrating an overview of a system 010 for tracking and recovering end-to-end transactions between applications, in accordance with one embodiment of the present invention. An upstream application 1010 is in operative communication with a downstream application 1012 and a transaction manager 1000 via a network 150. The upstream application 1010 comprises an upstream recovery code portion 1020 and an upstream application code portion 1030 that are operatively connected to the common application framework 120. The downstream application 1012 comprises a downstream recovery code portion 1022 and a downstream application code portion 1032 that are operatively connected to the common application framework 120. In some embodiments, the upstream recovery code portion 1020 is configured to send the transactional context to the downstream recovery code portion 1022 via the network 150 as illustrated in step 1090. The transactional context is routed to the downstream recovery portion 1022 as illustrated in step 1091.

The transaction manager 1000 reads the transactional metadata within the transactional context to determine a stage at which the transaction currently being processed on both a local (intra-node) level and an end-to-end (inter-node) level. In some embodiments, for example, the transaction manager may detect that the transaction is being processed within the third node (end-to-end level), which is currently conducting the second step within the third node (local level). In such an embodiment, the transaction manager may categorize the current status as "Step 3.2", with the "3" representing the stage of the end-to-end transaction and the "2" representing the stage of the local transaction. In some embodiments, the transaction manager 1000 may exist on a separate system on the network. In other embodiments, the transaction manager may be incorporated into the common application framework 120 amongst all of the networked systems involved in the transaction.

In some embodiments, the transaction manager 1000 may be configured to detect the transaction identifier within the transactional context. In some embodiments, the transaction manager 1000 may be configured to share the state of the transaction with nodes in the sequence on an as-needed basis. In some embodiments, the transaction manager 1000 may detect the end-to-end and local states of the transaction through a transaction monitor. In some embodiments, the transaction manager 1000 may comprise the transaction monitor. In other embodiments, the transaction monitor may exist on a separate computing system from the transaction manager 1000.

In some embodiments, the recovery code portions 1020, 1022 may be configured to publish, in real time, an event to the transaction manager 1000 to convey the state of the end-to-end and local transaction. In some embodiments, the event may be a completion event signifying the completion of the local transaction within a particular node. In some embodiments, the event may be an error event conveying the step in the local transaction at which the transaction failed. The upstream recovery code portion 1020 publishes its events through the network 150 as illustrated in step 1080. The downstream recovery code portion 1022 also publishes its events through the network 150 as illustrated in step 1081. The published events are received by the transaction manager over the network 150 as illustrated in step 1082.

In some embodiments, the transaction manager 1000 is configured to attempt recovery of the end-to-end transaction starting from the end-to-end step and the local step at which the transaction failed. In some embodiments, the transaction manager 1000 may request the failed node to retry the transaction locally. In some embodiments, the transaction manager 1000 may share the transactional context with a healthy node in the sequence to complete the local transactions of the failed node. In such an embodiment, the healthy node may exclusively use the transactional metadata to complete the transaction.

FIG. 11 is a block diagram illustrating another embodiment of the system 011 for tracking and recovering an end-to-end transaction. In addition to the system as illustrated in FIG. 10, a midstream application 1011 is in operative communication with the upstream application 1010 and the downstream application 1012. The midstream application 1011 comprises a midstream recovery code portion 1121 and a midstream application code portion 1131 in operative communication with the common application framework 120. In some embodiments, the upstream application code portion 1030, the midstream application code portion 1131, and the downstream application code portion 1032 are configured to perform distinct yet related functions within the end-to-end transaction. In some embodiments, the distinct functions each comprise steps of a local transaction occurring within the upstream, midstream, or downstream node. In such embodiments, the recovery code portions 1020, 1121, 1022 may nevertheless attempt to perform state-specific recovery using the transactional metadata. The upstream recovery code portion 1020 may send the transactional context to the midstream recovery code portion 1121 over the network 150 as illustrated by step 1190. The midstream recovery code portion 1121 may then receive the transactional context, conduct its local transactions according to the transactional context, then send the transactional context to the downstream recovery code portion 1022 over the network 150 as illustrated by step 1192. The downstream recovery code portion 1022 may then receive the transactional context over the network 150 as illustrated in step 1191. In some embodiments, the midstream recovery code portion may publish an event to the transaction manager through the network 150 as illustrated in step 1183, after which the event is received by the transaction manager as illustrated in step 1082. In some embodiments, the transactional context is updated within each node upon receipt of the transactional context, upon successful completion or failure of the steps in the transaction, and right before sending the transactional context to the next node in the sequence.

FIG. 12 is a block diagram illustrating the physical/logical partitions within the nodes in the array of the system 012, in accordance with one embodiment of the present invention. The upstream application 1010 comprises a first data center 110 and a second data center 111. The downstream application 1012 comprises a third data center 1200 and a fourth data center 1201. In some embodiments, a processing error occurring within the first data center 110 may be corrected by the second data center 111. In some embodiments, a transactional context may be sent to the downstream application 1012 to aid in correcting the processing error via the third data center 1200 or the fourth data center 1201. In some embodiments, the transactional context further comprises the state of a transaction within the data centers 110, 111, 1200, 1201. In this way, the transaction manager may monitor the progress of a transaction within the data centers 110, 111, 1200, 1201 of the nodes in the array.

FIG. 13 is a block diagram illustrating another embodiment of the physical/logical partitions within the nodes in the array of the system 013, in accordance with one embodiment of the present invention. In addition to the system as illustrated in FIG. 12, the system further comprises a midstream application 1011 in operative communication with the upstream application 1010 and the downstream application 1012 via the network 150. The midstream application 1011 comprises a fifth data center 1300 and a sixth data center 1301. In some embodiments, a processing error occurring within a fifth data center 1300 may be corrected by the sixth data center 1301. In some embodiments, the processing error may be corrected by the upstream application 1010 or the downstream application 1012 by using the transactional context.

FIG. 14 is a block diagram illustrating a transactional context to be used by the system 014 for tracking and recovering end-to-end transactions, in accordance with one embodiment of the present invention. The transactional context 300 comprises transactional metadata 320, which in turn comprises a state of the local transaction 1401 and the state of the end-to-end transaction 1402. The state of the local transaction 1401 comprises a plurality of local transaction steps 1411, 1412, 1413. The state of the end-to-end transaction 1402 comprises a plurality of global transaction steps 1421, 1422, 1423. In some embodiments, the local transaction steps 1421, 1422, 1423 signify the state of the transaction occurring within a node in the array. In some embodiments, the local transaction steps 1421, 1422, 1423 signify the state of the transaction occurring within one of the data centers within the node. In some embodiments, the global transaction steps 1421, 1422, 1423 signify the state of the global transaction occurring across all of the nodes in the array. In some embodiments, each node in the array performs a function to process the global transaction. In some embodiments, each node in the array performs a step in an ordered global transaction. In some embodiments, the transactional context may further comprise executable code 310, which contains instructions on how to process the transaction. In some embodiments, the transactional metadata 320 further comprises a local transaction pointer 1491, which directs the systems receiving the transactional context to the steps of the local transaction 1411, 1412, 1413 that are currently being conducted within a particular node. In some embodiments, the transactional metadata 320 may further comprise a global transaction pointer 1492, which directs the systems receiving the transactional context to the global steps within the end-to-end transaction 1421, 1422, 1423. In some embodiments, the transactional metadata 320 may further comprise technical metadata 350. The technical metadata 350 includes information regarding the systems and devices involved in the transaction, such as IP address data 351 of the systems, system origin data 352 signifying the system from which the transaction originated, and the system destination data 353 signifying the intended system end point of the transaction.

In some embodiments, the transactional metadata 320 may further comprise business metadata 340. The business metadata 340 includes information regarding the business aspects of the transaction, such as the transaction origin 341 indicating the source of resources to be transferred, the transaction destination 342 indicating the intended recipient of the resources, and the transaction amount 343 indicating the amount of resources to be allocated.

FIG. 15 is a process flow diagram illustrating a method 015 for conducting end-to-end transaction recovery, in accordance with one embodiment of the present invention. The process begins at block 1501, by generating a transactional context within an upstream recovery code portion of an upstream application. In such an embodiment, the upstream application is the originator of the transaction, wherein the start of a new transaction triggers the creation of the transactional context within the memory. In some embodiments, the transactional context is generated from the beginning of an end-to-end transaction and persists within the memory until the end-to-end transaction has successfully completed. In some embodiments, the upstream application is the first node in the sequence of nodes that process the transaction.

The transaction continues to block 1502, by determining that the local transaction within the upstream application has successfully completed. In some embodiments, the upstream application appends the completed status of the local transaction to the transactional metadata. In some embodiments, the local transaction may be the state of the transaction within the upstream application. In some embodiments, the upstream application appends the completed status of a step in the end-to-end transaction as well as the status of the local transaction to the transactional metadata.

The process continues to block 1503, by publishing an upstream completion event to the transaction manager. In some embodiments, the upstream completion event comprises the transactional context. In some embodiments, the transaction manager maintains a database of states of the end-to-end transactions and local transactions.

The process continues to block 1504, by sending the transactional context to the next node in the sequential array of nodes. In some embodiments, the next node in the sequence is one of a plurality of midstream applications, the midstream applications being the intermediary nodes in the sequence. In some embodiments, the next node in the sequence is a downstream application. In some embodiments, the downstream application is the terminal node in the sequence of nodes. In some embodiments, the previous node sends the transactional context to the next node in the sequence directly. In some embodiments, the transaction manager sends the transactional context to the next node in the sequence. In such an embodiment, the transaction manager may be configured to skip one or more of the nodes in the sequence and send the transactional context to one specific node in the sequence.

The process continues to block 1505, by receiving the transactional context at the recovery code portion of the next node in the sequence. In some embodiments, the recovery code portion may be configured to read the transactional metadata directly from the transactional context. In some embodiments, the recovery code portion may run the executable code within the transactional context to carry out its functions. In some embodiments, the node will complete its local transactions. In some embodiments, the node will conduct recovery on behalf of another node.

The process continues to block 1506, by appending to the set of metadata a state of a local transaction within the downstream application. In some embodiments, the state of a local transaction may comprise steps of the local transaction. In some embodiments, the state of a local transaction may be appended to the set of metadata in real time, after the completion of each step in the local transaction. In some embodiments, the state of the local transaction may be appended to the set of metadata only when a processing error occurs during the local transaction.

The process continues to block 1507, by updating the state of the end-to-end transaction. In some embodiments, the process also updates the state of the local transaction. The process further continues to block 1508, by publishing a downstream completion event to the transaction manager. In some embodiments, the downstream completion event comprises the completed state of the local transaction. In some embodiments, the downstream completion event further comprises the completed state of the end-to-end transaction.

Finally, the process continues to block 1509, by deleting the transactional context. In some embodiments, the transactional context is deleted upon completion of the end-to-end transaction. In some embodiments, the transaction manager maintains a record of the completion of the end-to-end transaction. In such an embodiment, the transaction manager writes of the information within the transactional context to a durable storage medium. In some embodiments, the durable storage medium may exist on a server on the network. In some embodiments, the durable storage medium may exist on a decentralized cloud. In some embodiments, the record may further include the completion of the local transactions within each node in the sequence that processed the end-to-end transaction. In some embodiments, the transactional context may be reconstituted from the data stored in the durable storage medium on an as-needed basis.

FIG. 16 is a block diagram illustrating the individual physical/logical components within the computing devices of the nodes in the system 016, in accordance with one embodiment of the present invention. An upstream node computing device 1600 comprises a network communication interface 910 operatively coupled to a processing device 920, which is operatively coupled to a memory device 930, the memory device 930 comprising an upstream application code portion 1640 and an upstream recovery code portion 1630 operatively coupled to the common application framework 120. The network communication interface 910 contains devices that allow the upstream node computing device 1600 to connect to the network 150.

The upstream node computing device 1600 is, through the network 150, in operative communication with the second downstream node computing device 1601, which comprises a network communication interface 911 that is operatively coupled to a processing device 921, which is operatively coupled to a memory device 931, the memory device 931 comprising the downstream application code portion 1641 and the downstream recovery code portion 1631 operatively coupled to the common application framework 120. In some embodiments, the memory device is a non-transitory computer-readable medium. In some embodiments, the memory device may be a high-bandwidth computer storage medium, such as random-access memory (RAM). In such embodiments, the memory device further comprises the transactional context. In some embodiments, the memory device medium may be a hard drive.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
|---|---|---|---|
| 7287US1.014033.2848 | 15/241,940, now published as 2018/0054358 | SYSTEM FOR INCREASING COMPUTING EFFICIENCY OF COMMUNICATION BETWEEN APPLICATIONS RUNNING ON NETWORKED MACHINES | Concurrently herewith |
| 7286US1.014033.2867 | 15/242,106, now published as 2018/0052747 | SYSTEM FOR INCREASING INTRA-APPLICATION PROCESSING EFFICIENCY BY TRANSMITTING FAILED PROCESSING WORK OVER A PROCESSING RECOVERY NETWORK FOR RESOLUTION | Concurrently herewith |

What is claimed is:

1. A system for conducting a state-specific recovery of an end-to-end transaction, comprising:
   an array of nodes arranged in a sequence, the array of nodes comprising at least an upstream node and a downstream node, wherein the upstream node is the first node in the sequence, and wherein the downstream node is the terminal node in the sequence; and
   a transaction manager,
   wherein the upstream node comprises an upstream system, which comprises an upstream processor, a memory device, and a communication device, and an upstream application stored in the memory device, comprising computer-readable instructions comprising:
      an upstream application code portion;
      an upstream recovery code portion; and
      a common application framework, wherein the upstream recovery code portion is in communication with the upstream application code portion via the common application framework,
   wherein the downstream node comprises a downstream system, which comprises a downstream processor, a memory device, and a communication device, and a downstream application stored in the memory device, comprising computer-readable instructions comprising:
      a downstream application code portion;
      a downstream recovery code portion; and
      the common application framework, wherein the downstream recovery code portion is in communication with the upstream application code portion via the common application framework,
   wherein the upstream recovery code portion when executed by the upstream processor causes the upstream processor to:
      generate a transactional context, the transactional context comprising a set of metadata, the set of metadata comprising:
         a state of a local transaction within the upstream application; and
         a state of the end-to-end transaction;
      determine that the local transaction within the upstream application has successfully completed;
      publish an upstream completion event to the transaction manager, the upstream completion event comprising the state of the end-to-end transaction; and
      send, over a network, the transactional context to a next node in the sequence, and
   wherein the downstream recovery code portion when executed by the downstream processor causes the downstream processor to:
      receive, over the network, the transactional context from a previous node in the sequence;
      append, to the set of metadata, a state of a local transaction within the downstream application;
      detect that the local transaction within the downstream application has failed to successfully complete the local transaction;
      detect an error in a first fail server;
      determine a step at which the downstream application has failed to successfully complete the local transaction;
      publish a downstream error event comprising the transactional context to the local transaction manager, the downstream error event comprising the state of the local transaction within the downstream application and the state of the end-to-end transaction, wherein the state of the local transaction within the downstream application comprises the step at which the local transaction has failed to successfully complete;
restart the step at which the local transaction failed based solely on the set of metadata within the transactional context;
determine that the local transaction within the downstream application has successfully completed;
update the state of the end-to-end transaction;
publish a downstream completion event to the transaction manager, the downstream completion event comprising the state of the end-to-end transaction; and
delete the transactional context.

2. The system of claim 1, wherein the array of nodes further comprises a midstream node, the midstream node comprising a midstream system, which comprises a midstream processor, a memory device, and a communication device, and a midstream application stored in the memory device, comprising computer-readable instructions comprising:
a midstream application code portion;
a midstream recovery code portion; and
a common application framework, wherein the midstream recovery code portion is in communication with the upstream application code portion via the common application framework,
wherein the midstream recovery code portion when executed by the midstream processor causes the midstream processor to:
receive, over the network, the transactional context from the previous node in the sequence;
append, to the metadata, a state of a local transaction within the midstream application;
determine that the local transaction within the midstream application has successfully completed;
update the state of the end-to-end transaction;
publish a midstream completion event to the transaction manager, the midstream completion event comprising the state of the end-to-end transaction; and
send, over the network, the transactional context to the next node in the sequence.

3. The system of claim 1, wherein the state of the end-to-end transaction comprises a plurality of global steps, the global steps representing various stages of the end-to-end transaction.

4. The system of claim 1, wherein the state of the local transaction within the upstream application comprises a plurality of local upstream steps, the local upstream steps representing various stages of the local transaction within the upstream application.

5. The system of claim 1, wherein the state of the local transaction within the downstream application comprises a plurality of local downstream steps, the local downstream steps representing various stages of the local transaction within the downstream application.

6. The system of claim 2, wherein the state of the local transaction within the midstream application comprises a plurality of local midstream steps, the local midstream steps representing various stages of the local transaction within the midstream application.

7. The system of claim 1, wherein the upstream recovery code portion is further configured to cause the upstream processor to:
detect that the local transaction within the upstream application has failed to successfully complete;
publish an upstream error event to the transaction manager, the upstream error event comprising the state of the local transaction within the upstream application and the state of the end-to-end transaction; and
restart the local transaction within the upstream application.

8. The system of claim 2, wherein the midstream recovery code portion is further configured to cause the midstream processor to:
detect that the transaction within the midstream application has failed to successfully complete;
publish a midstream error event to the transaction manager, the midstream error event comprising the state of the transaction within the midstream application and the state of the end-to-end transaction; and
restart the local transaction within the midstream application.

9. A computer-implemented method for conducting a state-specific recovery of an end-to-end transaction, executed by an upstream processor of an upstream system within an upstream node and a downstream processor of a downstream system within a downstream node, wherein the upstream system comprises a memory device and a communication device, wherein an upstream application is stored on the memory device comprising:
an upstream application code portion;
an upstream recovery code portion; and
a common application framework, wherein the upstream recovery code portion is in communication with the upstream application code portion via the common application framework,
wherein the downstream system comprises a memory device and a communication device, wherein a downstream application is stored on the memory device comprising:
a downstream application code portion;
a downstream recovery code portion; and
the common application framework, wherein the downstream recovery code portion is in communication with the upstream application code portion via the common application framework,
said method comprising:
generating, by the upstream processor executing the upstream recovery code portion, a transactional context within the upstream recovery code portion, the transactional context comprising a set of metadata, the set of metadata comprising:
a state of a local transaction within the upstream application; and
a state of the end-to-end transaction;
determining, by the upstream processor executing the upstream recovery code portion, that the local transaction within the upstream application has successfully completed;
publishing, by the upstream processor executing the upstream recovery code portion, an upstream completion event to a transaction manager, the upstream completion event comprising the state of the end-to-end transaction; and
sending, by the upstream processor executing the upstream recovery code portion, over a network, the transactional context to a next node in a sequential array of nodes,
receiving, by the downstream processor executing the downstream recovery code portion, the transactional context over the network;

appending, by the downstream processor executing the downstream recovery code portion, to the set of metadata, a state of a local transaction within the downstream application;

detecting, by the downstream processor executing the downstream recovery code portion, that the local transaction within the downstream application has failed to successfully complete the local transaction;

detecting, by the downstream processor executing the downstream recovery code portion, an error in a first fail server;

determining, by the downstream processor executing the downstream recovery code portion, a step at which the downstream application has failed to successfully complete the local transaction;

publishing, by the downstream processor executing the downstream recovery code portion, a downstream error event comprising the transactional context to the local transaction manager, the downstream error event comprising the state of the local transaction within the downstream application and the state of the end-to-end transaction, wherein the state of the local transaction within the downstream application comprises the step at which the local transaction has failed to successfully complete;

restarting, by the downstream processor executing the downstream recovery code portion, the step at which the local transaction failed based solely on the set of metadata within the transactional context;

determining, by the downstream processor executing the downstream recovery code portion, that the local transaction within the downstream application has successfully completed;

updating, by the downstream processor executing the downstream recovery code portion, the state of the end-to-end transaction;

publishing, by the downstream processor executing the downstream recovery code portion, a downstream completion event to the transaction manager, the downstream completion event comprising the state of the end-to-end transaction; and deleting, by the downstream processor executing the downstream recovery code portion, the transactional context.

10. The computer-implemented method of claim 9, further being executed by a midstream processor of a midstream system within a midstream node, wherein the midstream node is the next node in the sequence, wherein the midstream system comprises a midstream processor, a memory device, and a communication device, and a midstream application stored in the memory device, comprising computer-readable instructions comprising:

a midstream application code portion;
a midstream recovery code portion; and
the common application framework, wherein the midstream recovery code portion is in communication with the upstream application code portion via the common application framework,
said method comprising:
receiving, by the midstream processor executing the midstream recovery code portion, over the network, the transactional context from the previous node in the sequence;
appending, by the midstream processor executing the midstream recovery code portion, to the metadata, a state of a local transaction within the midstream application;

determining, by the midstream processor executing the midstream recovery code portion, that the local transaction within the midstream application has successfully completed;

updating, by the midstream processor executing the midstream recovery code portion, the state of the end-to-end transaction;

publishing, by the midstream processor executing the midstream recovery code portion, a midstream completion event to the transaction manager, the midstream completion event comprising the state of the end-to-end transaction; and sending, by the midstream processor executing the midstream recovery code portion, over the network, the transactional context to the next node in the sequence.

11. The computer-implemented method of claim 9, wherein the state of the end-to-end transaction comprises a plurality of global steps, the global steps representing various stages of the end-to-end transaction.

12. The computer-implemented method of claim 9, wherein the state of the local transaction within the upstream application comprises a plurality of local upstream steps, the local upstream steps representing various stages of the transaction within the upstream application.

13. The computer-implemented method of claim 9, wherein the state of the local transaction within the downstream application comprises a plurality of local downstream steps, the local downstream steps representing various stages of the transaction within the downstream application.

14. The computer-implemented method of claim 10, wherein the state of the local transaction within the midstream application comprises a plurality of local midstream steps, the local midstream steps representing various stages of the transaction within the midstream application.

15. The computer-implemented method of claim 9, further comprising:
detecting, by the upstream processor executing the upstream recovery code portion, that the local transaction within the upstream application has failed to successfully complete;

publishing, by the upstream processor executing the upstream recovery code portion, an upstream error event to the transaction manager, the upstream error event comprising the state of the local transaction within the upstream application and the state of the end-to-end transaction; and restarting, by the upstream processor executing the upstream recovery code portion, the local transaction within the upstream application.

16. The computer-implemented method of claim 10, further comprising:
detecting, by the midstream processor executing the midstream recovery code portion, that the local transaction within the midstream application has failed to successfully complete;

publishing, by the midstream processor executing the midstream recovery code portion, a midstream error event to the transaction manager, the midstream error event comprising the state of the local transaction within the midstream application and the state of the end-to-end transaction; and restarting, by the midstream processor executing the midstream recovery code portion, the local transaction within the midstream application.

17. A computer program product for conducting a state-specific recovery of an end-to-end transaction, executed by an upstream processor of an upstream system within an upstream node and a downstream processor of a downstream system within a downstream node, wherein the upstream system comprises a memory device and a communication device, wherein an upstream application is stored on the memory device comprising:

an upstream application code portion;

an upstream recovery code portion; and a common application framework, wherein the upstream recovery code portion is in communication with the upstream application code portion via the common application framework, wherein the downstream system comprises a memory device and a communication device, wherein a downstream application is stored on the memory device comprising:

a downstream application code portion;

a downstream recovery code portion; and the common application framework, wherein the downstream recovery code portion is in communication with the upstream application code portion via the common application framework, said computer program product comprising at least one non-transitory computer-readable medium having computer-readable program code portions embodied therein, the computer-readable program code portions comprising:

an executable portion configured for generating a transactional context, the transactional context comprising a set of metadata, the set of metadata comprising:

a state of a local transaction within the upstream application; and a state of the end-to-end transaction;

an executable portion configured for determining that the local transaction within the upstream application has successfully completed;

an executable portion configured for publishing an upstream completion event to the transaction manager, the upstream completion event comprising the state of the end-to-end transaction; and an executable portion configured for sending, over a network, the transactional context to a next node in the sequence, and wherein the downstream recovery code portion when executed by the downstream processor causes the downstream processor to:

an executable portion configured for receiving, over the network, the transactional context from a previous node in the sequence;

an executable portion configured for appending, to the set of metadata, a state of a local transaction within the downstream application;

an executable portion configured for detecting that the local transaction within the downstream application has failed to successfully complete the local transaction;

an executable portion configured for detecting an error in a first fail server;

an executable portion configured for determining a step at which the downstream application has failed to successfully complete the local transaction;

an executable portion configured for publishing a downstream error event comprising the transactional context to the local transaction manager, the downstream error event comprising the state of the local transaction within the downstream application and the state of the end-to-end transaction, wherein the state of the local transaction within the downstream application comprises the step at which the local transaction has failed to successfully complete;

an executable portion configured for restarting the step at which the local transaction failed based solely on the set of metadata within the transactional context;

an executable portion configured for determining that the local transaction within the downstream application has successfully completed;

an executable portion configured for updating the state of the end-to-end transaction;

an executable portion configured for publishing a downstream completion event to the transaction manager, the downstream completion event comprising the state of the end-to-end transaction; and an executable portion configured for deleting the transactional context.

18. The computer program product of claim 17, wherein the state of the end-to-end transaction comprises a plurality of global steps, the global steps representing various stages of the end-to-end transaction.

19. The computer program product of claim 17, wherein the state of the local transaction within the upstream application comprises a plurality of local upstream steps, the local upstream steps representing various stages of the transaction within the upstream application.

20. The computer program product of claim 17, wherein the state of the local transaction within the downstream application comprises a plurality of local downstream steps, the local downstream steps representing various stages of the transaction within the downstream application.

* * * * *